US010346019B2

(12) United States Patent
Migos et al.

(10) Patent No.: US 10,346,019 B2
(45) Date of Patent: Jul. 9, 2019

(54) GRAPHICAL USER INTERFACE FOR PROVIDING VIDEO IN A DOCUMENT READER APPLICATION

(71) Applicant: Apple Inc., Cupertino, CA (US)

(72) Inventors: Charles J Migos, Millbrae, CA (US); Tom E Klaver, Mountain View, CA (US); Brian James Turner, Belvedere-Tiburon, CA (US); Michel Elings, Palo Alto, CA (US); Martin Walvius, San Francisco, CA (US); Glenn Wolters, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 291 days.

(21) Appl. No.: 15/261,405

(22) Filed: Sep. 9, 2016

(65) Prior Publication Data
US 2017/0199659 A1    Jul. 13, 2017

Related U.S. Application Data

(60) Provisional application No. 62/276,854, filed on Jan. 9, 2016.

(51) Int. Cl.
*G06F 17/21* (2006.01)
*G06F 3/0484* (2013.01)
(Continued)

(52) U.S. Cl.
CPC ........ *G06F 3/04847* (2013.01); *G06F 3/0481* (2013.01); *G06F 3/0482* (2013.01);
(Continued)

(58) Field of Classification Search
CPC .. G06F 3/04847; G06F 3/0481; G06F 17/212; G06F 3/0482; G06F 3/0485; G06F 3/0488; G11B 27/34
See application file for complete search history.

(56) References Cited

U.S. PATENT DOCUMENTS

| 8,196,045 B2 | 6/2012 | Chandratillake et al. |
| 8,706,841 B2 * | 4/2014 | Gordon .............. H04N 21/2665 709/201 |

(Continued)

FOREIGN PATENT DOCUMENTS

| WO | WO 2013/138846 | 9/2013 |
| WO | WO 2014/049398 | 4/2014 |

OTHER PUBLICATIONS

Author Unknown "AP Mobile: What's New in Version 6.8.2, Bug Fixes", Updated Aug. 17, 2015, 3 pages, The Associated Press, New York, USA.

*Primary Examiner* — Shen Shiau

(74) *Attorney, Agent, or Firm* — Fletcher Yoder PC

(57) ABSTRACT

Some embodiments provide a GUI for a document reader application for viewing videos in video document panes. In some embodiments, the GUI determines whether to play the video inline within a document pane based on the size of the video document pane. In some embodiments, when a video is being played within a video document pane, a user can select the body of the video document pane to show the full content of the video document. Some embodiments provide a GUI that, when a user scrolls a video off-screen while the videos are playing inline in the document panes, pauses or stops the playback of the video and provides an indication that the playback is being stopped. In some embodiments, the indication is a fading of the video or of audio associated with the video, as the video document is scrolled off-screen.

16 Claims, 17 Drawing Sheets

(51) Int. Cl.
   *G06F 3/0481* (2013.01)
   *G06F 3/0482* (2013.01)
   *G11B 27/34* (2006.01)
   *G06F 3/0485* (2013.01)
   *G06F 3/0488* (2013.01)

(52) U.S. Cl.
   CPC .......... *G06F 3/0485* (2013.01); *G06F 17/212* (2013.01); *G11B 27/34* (2013.01); *G06F 3/0488* (2013.01); *G06F 17/21* (2013.01)

(56) References Cited

U.S. PATENT DOCUMENTS

| | | | | |
|---|---|---|---|---|
| 8,782,513 | B2* | 7/2014 | Migos | G06F 1/1626 715/230 |
| 8,997,021 | B2 | 3/2015 | Liang et al. | |
| 9,167,197 | B1* | 10/2015 | Jayaram | H04N 5/76 |
| 9,691,086 | B1* | 6/2017 | Deodhar | G06F 17/21 |
| 2003/0115598 | A1* | 6/2003 | Pantoja | H04N 5/44591 725/40 |
| 2007/0294238 | A1* | 12/2007 | Citron | G06F 17/248 |
| 2010/0064233 | A1* | 3/2010 | Dewar | G06F 16/958 715/760 |
| 2012/0311436 | A1* | 12/2012 | Steele | G06F 17/212 715/246 |
| 2013/0024757 | A1* | 1/2013 | Doll | G06F 17/212 715/204 |
| 2013/0124980 | A1* | 5/2013 | Hudson | G06F 17/21 715/243 |
| 2013/0298013 | A1* | 11/2013 | Hunter | G06F 17/2241 715/243 |
| 2014/0068444 | A1 | 3/2014 | Arrasvuori et al. | |
| 2014/0075289 | A1* | 3/2014 | Brant | G06F 17/217 715/234 |
| 2014/0164890 | A1* | 6/2014 | Fox | G06F 17/2229 715/202 |
| 2014/0258849 | A1* | 9/2014 | Chung | G06F 17/212 715/243 |
| 2014/0365890 | A1* | 12/2014 | Lei | H04N 21/4143 715/719 |
| 2015/0019958 | A1* | 1/2015 | Ying | G06F 17/211 715/243 |
| 2016/0124625 | A1* | 5/2016 | Lawton | H04N 21/4312 715/800 |
| 2016/0124911 | A1* | 5/2016 | Ying | G06F 16/313 715/238 |
| 2016/0203108 | A1* | 7/2016 | Strong | G06F 17/212 715/243 |
| 2016/0219340 | A1* | 7/2016 | Perez | H04N 21/47202 |
| 2016/0357364 | A1* | 12/2016 | Zoon | G06F 3/0482 |
| 2017/0017616 | A1* | 1/2017 | Elings | G06F 17/212 |
| 2017/0026689 | A1* | 1/2017 | Retureau | G06F 3/165 |
| 2017/0124048 | A1* | 5/2017 | Campbell | G06F 17/212 |
| 2017/0177547 | A1* | 6/2017 | Ciereszko | G06F 17/212 |
| 2017/0270079 | A1* | 9/2017 | Rajwat | G06F 17/212 |
| 2017/0308518 | A1* | 10/2017 | Sjolander | G06F 17/248 |
| 2017/0357621 | A1* | 12/2017 | Metz | G06F 17/212 |
| 2017/0357623 | A1* | 12/2017 | MacLean | G06F 17/30719 |

\* cited by examiner

GRAPHICAL USER INTERFACE FOR PROVIDING VIDEO IN A DOCUMENT READER APPLICATION

BACKGROUND

Document reader applications are often used for viewing electronic documents, such as electronic articles or webpages, on a device. The electronic articles are often from various sources or publishers, and related to a variety of different topics. Increasingly, publishers have begun to include videos associated with the various articles. Document reader applications often need to provide the article content in various sizes and formats for several different types of devices with different screen sizes and resolutions. It is difficult to present video content to users of a document reader application in a manner that is convenient and pleasant for the various screen sizes.

BRIEF SUMMARY

Some embodiments provide a document reader application for viewing content, such as text and associated images and video, of various documents. The document reader of some embodiments collects documents (e.g., magazine articles, web blog posts, word processing documents, slides of a presentation, etc.) from a variety of different sources (e.g., websites, magazine publishers, newspapers, etc.). In this application, many of the examples are described with reference to articles, but it should be clear to one skilled in the art that the articles may refer to any type of document. The videos associated with the documents are often provided through a link to media servers of the content providers, or of third-party media services.

In some embodiments, the document reader application provides a graphical user interface (GUI) for viewing videos associated with documents displayed in the document reader application. The GUI of some embodiments displays a first set of video document panes, where each video document pane of the first set includes a video indicator and a second set of video document panes, where each video document pane of the second set includes a playable video control. The video indicators do not play the associated video inline, but rather provide an article view of the document. The playable video controls allow the video to be played within the video document pane. In some embodiments, the determination of whether a video document pane has a playable video control or a non-playable video indicator is based on the size of the video document pane, or the space allocated to displaying the video within the video document pane.

In some embodiments, when a video is being played within a video document pane, a user can select the body of the video document pane to show the full content of the video document. In some such embodiments, the feed view and the article view use a single video player control such that the playback of the video is not interrupted when the GUI transitions from the feed view to the article view.

Some embodiments provide a GUI that, when a user scrolls a video off-screen while the videos are playing inline in the document panes, pauses or stops the playback of the video and provides an indication that the playback is being stopped. In some embodiments, the indication is a fading of the video or of audio associated with the video, as the video document is scrolled off-screen.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
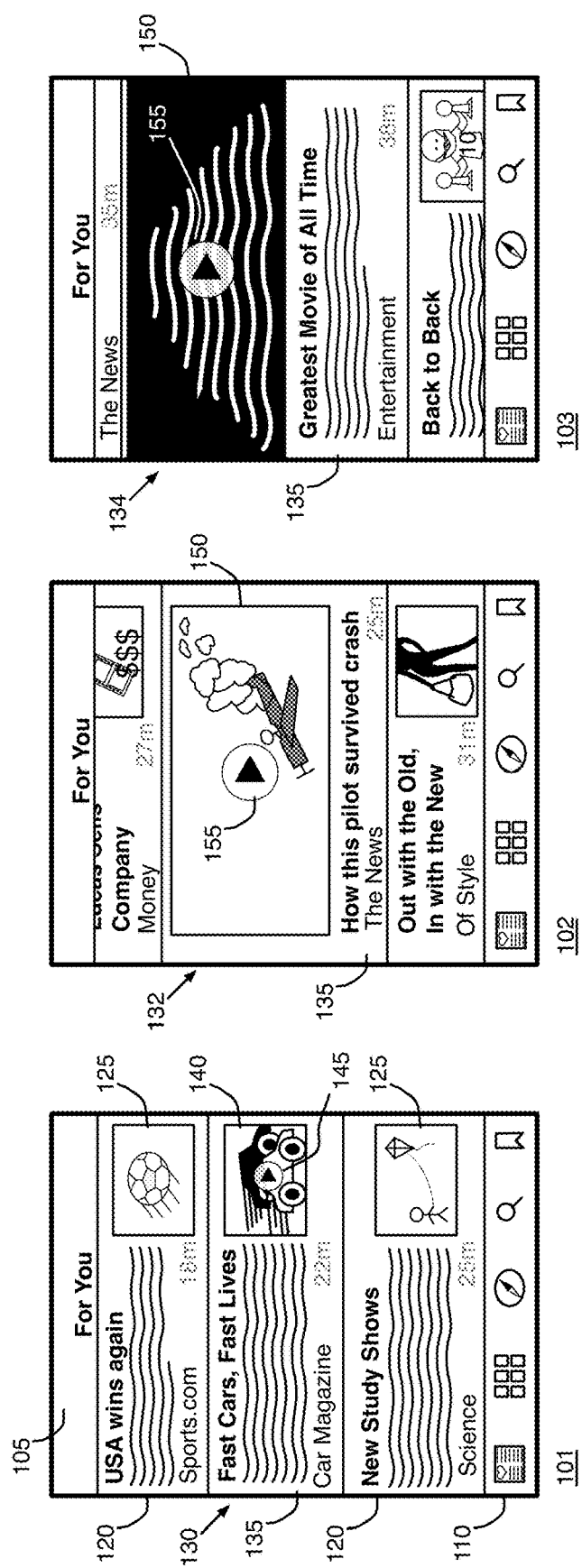
FIG. 1 illustrates three examples of displaying a feed view with document panes of various sizes for a small format mobile device.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a document reader application for viewing content, such as text and associated images and video, of various documents. The document reader of some embodiments collects documents (e.g., magazine articles, web blog posts, word processing documents, slides of a presentation, etc.) from a variety of different sources (e.g., websites, magazine publishers, newspapers, etc.). In this application, many of the examples are described with reference to articles, but it should be clear to one skilled in the art that the articles may refer to any type of document. The videos associated with the documents are often provided through a link to media servers of the content providers, or of third-party media services.

In some embodiments, the document reader application provides a graphical user interface (GUI) for viewing videos associated with documents displayed in the document reader application. The GUI of some embodiments displays a first set of video document panes, where each video document pane of the first set includes a video indicator and a second set of video document panes, where each video document pane of the second set includes a playable video control. The video indicators do not play the associated video inline, but rather provide an article view of the document. The playable video controls allow the video to be played within the video document pane. In some embodiments, the determination of whether a video document pane has a playable video control or a non-playable video indicator is based on the size of the video document pane, or the space allocated to displaying the video within the video document pane.

In some embodiments, when a video is being played within a video document pane, a user can select the body of the video document pane to show the full content of the video document. In some such embodiments, the feed view and the article view use a single video player control such that the playback of the video is not interrupted when the GUI transitions from the feed view to the article view.

Some embodiments provide a GUI that, when a user scrolls a video off-screen while the videos are playing inline in the document panes, pauses or stops the playback of the video and provides an indication that the playback is being stopped. In some embodiments, the indication is a fading of the video or of audio associated with the video, as the video document is scrolled off-screen.

Many examples of a document reader application are described below. Section I describes a document reader application for viewing video document panes (i.e., document panes for documents associated with a video). Section II then describes examples of navigation of the video contents of the video documents within the document reader application. Finally, Section III describes several example electronic systems that implement some embodiments described herein.

I. Document Reader Application with Video Document Panes

In some embodiments, the document reader is for viewing articles and other content that is provided by a variety of sources regarding a variety of different topics. The user selects various different sources and topics to add to their favorites collection based on their interests. The document reader then retrieves content from the various sources and content related to the various topics, and presents different views (e.g., feed views, article views, etc.) of the content to the user.

The document reader application of some embodiments provides a document feed view for viewing summaries or excerpts of several documents in a single ordered layout. In some embodiments, the document reader application provides various different feed views based on different criteria. For example, the document reader application of some embodiments provides various feed views based on the publisher (or provider) of a group of articles, a topic (e.g., fashion, technology, etc.) for a group of articles, or a user-established status for the articles (e.g., bookmarked, saved, favorite, etc.).

FIG. 1 illustrates three examples of displaying a feed view with document panes of various sizes for a small-format mobile device (e.g., a mobile phone, etc.). Each of the examples 101-103 shows a graphical user interface (GUI) for a document reader application of some embodiments. The GUI includes a title bar 105 that provides context for the documents viewed in the display area and a tool bar 110 with various controls for navigating to other views (e.g., channel views, personalized views, suggested articles, etc.) of the application or for interacting (e.g., search, bookmarking, etc.) with the displayed articles.

In order to display a particular feed in the GUI, the document reader of some embodiments generates a layout for the documents of the feed by generating and arranging document panes that provide summary information (e.g., title, image, excerpt, etc.) for each document of the feed. The document panes are arranged within a display area so that a user can view and interact with the various documents. The various document panes contain different amounts of information (e.g., some document panes provide an image, while others do not). The document panes of some embodiments may use different internal layouts for the information presented in the document pane, with each internal layout using different aspect ratios, different amounts of text, etc.

In the first example 101, the GUI shows a feed view with document panes 120 for two articles and a video document pane 130 for a third article with associated video content. In some embodiments, the document panes 120 for the non-video articles show a body with information about the article (e.g., a title, a brief summary or intro, source, etc.). The document panes 120 in this example also include an image 125 associated with the article.

The first example 101 also shows a video document pane 130 with a body 135 similar to the bodies of the other non-video document panes 120. However, the video document pane 130 also shows a static thumbnail video indicator 140 to indicate that the article has an associated video. In this example, the video indicator 140 is a static thumbnail from the associated video with a play indicator 150. Alternatively or conjunctively, the video document panes of some embodiments provide other indications that there is an associated video. For example, in some embodiments, the video document panes are provided in a different color or with a different style than document panes for articles with no associated video. In some embodiments, the thumbnail video indicator 140 acts as a link to an article view of the selected document.

The document panes of some embodiments may use different internal layouts for the information presented in the document pane, with each internal layout using different aspect ratios, different amounts of text, etc. The second example 102 shows another format for a larger video document pane 132. In this example, the video control 150 takes up the majority of the width of the display area, emphasizing the video and providing greater visibility to the details of the video. In some embodiments, rather than a static thumbnail video indicator, the document reader application provides a larger, playable video control 150 for larger document panes. The playable video controls of some embodiments, unlike the static thumbnail video indicators, allow for the video to be played inline, within the feed view, without transitioning to a different view (e.g., a single article view) of the selected video document.

Similarly, the third example 103 shows a third format for a video document pane 134, with a full screen-width playable video control 150 and a detailed summary in the body 135. The various formats for the video document panes may be mixed throughout a feed view for the document reader application.

As shown in these examples, the various formats can provide different levels of control for the video (i.e., a static thumbnail video indicator versus a playable video control). In some embodiments, the determination of whether the document pane includes a playable control or a static thumbnail video indicator is dependent on the size and/or format of the particular video document pane.

Figure 2:
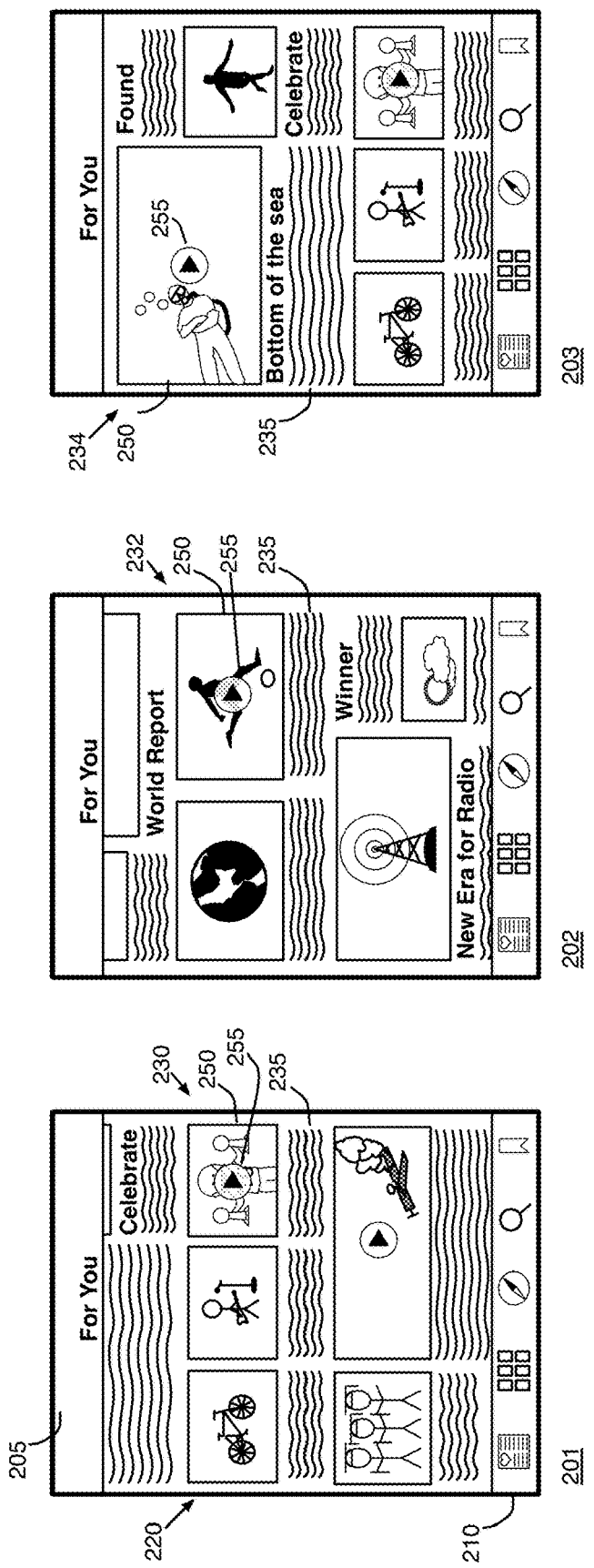
FIG. 2 illustrates three examples of displaying a feed view with document panes of various sizes for a large format mobile device.

In some embodiments, different devices provide different types of document panes. FIG. 2 illustrates three examples 201-203 of displaying a feed view with document panes of various sizes for a large-format mobile device (e.g., a tablet, laptop computer, etc.). The GUI of these examples is similar to the GUI of the examples of FIG. 1, with a title bar 205 and a toolbar 210. Unlike the example of FIG. 1, however, with a large-format display area, the GUI of FIG. 2 is able to show more articles at a time in the display area.

The first example 201 shows a small video document pane 230. The first example 201 shows document panes for several different articles in a feed view (i.e., "For You"). The document panes 220 for the non-video articles include a text body and an image. Although shown with an image in this example, in some embodiments, some of the document panes for the non-video articles do not include any image at all. The first example 201 also shows a video document pane 230 with a body 235, a thumbnail video indicator 240, and a play indicator 245. In this example, the feed view includes document panes for articles of different types (i.e., video and non-video documents). In some embodiments, the feed view includes only video document panes, while in other embodiments, the feed view displays document panes for various different types of documents (e.g., video documents, audio documents, image documents, text-only documents, etc.).

In some embodiments, the display area is defined as a set of equally-sized columns, and the various layouts for the different-sized document panes in the feed view are defined in terms of the number of columns that the document pane takes up. For example, in a 12-column layout, a 6-column document pane would take up half of the display area, while a 3-column document pane would take up a fourth of the display area. Each row of the display area can be made up of a single document pane (i.e., a 12-column pane), or multiple document panes (e.g., an 8-column pane and a 4-column pane). In example 201, each of the three document panes (including the video document pane) across the second row of the display area are allocated one third of the display area. In a 12-column format, each document pane would be a 4-column layout.

The second example 202 shows a video document pane 232 with a larger layout (e.g., a 6-column layout), where the video indicator 235 of each of the document panes (i.e., the video document pane and the non-video document pane of the second row) takes up half of the display area. The video document pane 232 includes a playable video control 250 with a play indicator 255 and a body 235. In this example, the larger layout for the document pane 232 is determined to be sufficient to display video, so a playable video control 250 is provided to allow a user to view the video inline in the feed view.

The third example 203 shows a video document pane 234 with an even larger layout (e.g., an 8-column layout), where the video indicator 235 spans the video document pane. In some embodiments, the video document pane can span the entire width of the display area. In some cases, due to the variety in sizes and layouts available for videos in the feed view of the document application layer, the layouts for some document panes may not be conducive to inline play even when the document pane is sufficiently large. For example, in some document pane layouts, the title and text are allocated a large portion of the space in the document pane, while the amount of space allocated to the video within the particular document pane layout is small.

In order to display several different articles (or documents) at a time, the feed view provides summaries or intros for each article, rather than the full content of the article. In some embodiments, when a user selects a summary document pane in a feed view, an article view is provided for the selected document to provide the full content of the document.

Figure 3:
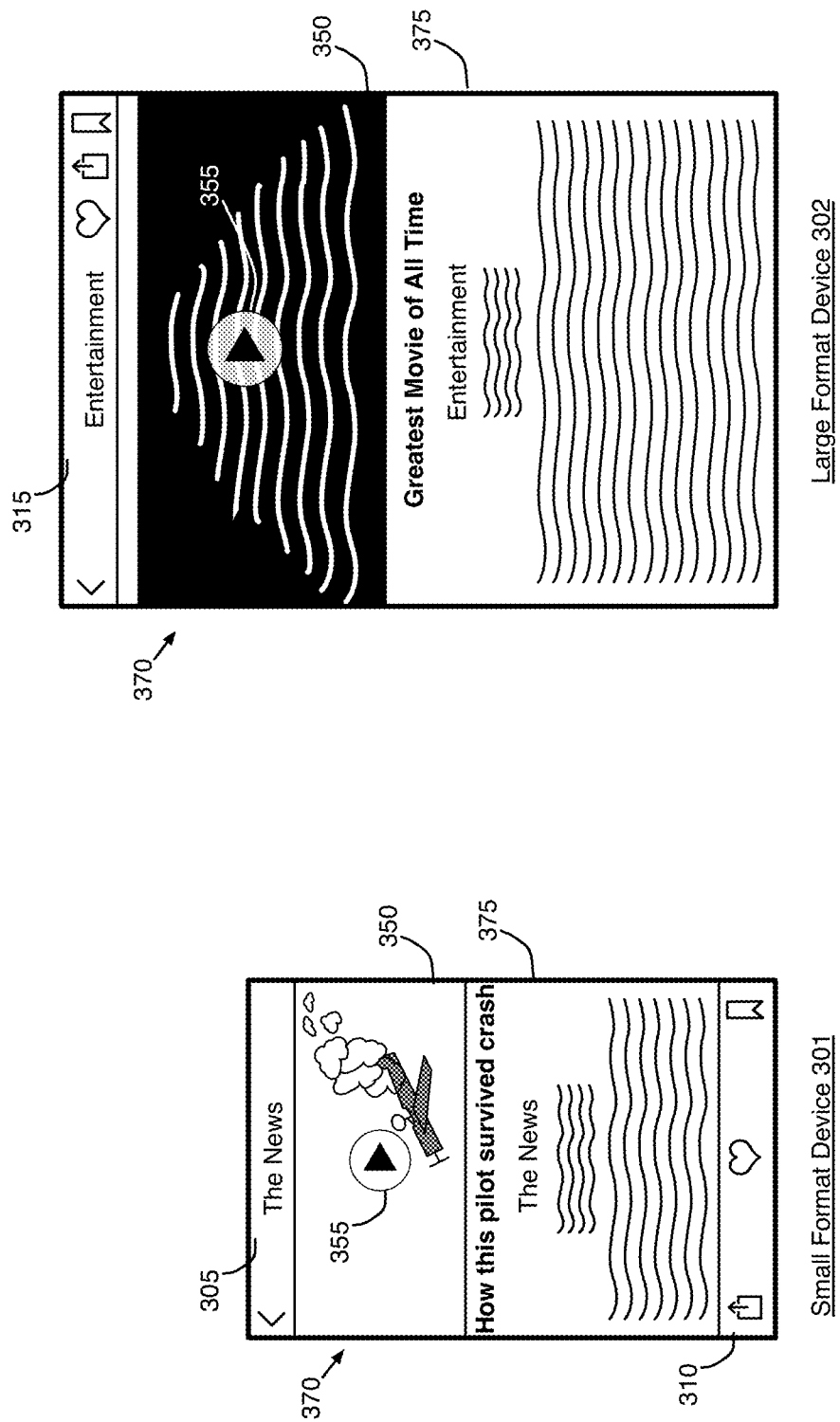
FIG. 3 illustrates an example of an article view of a particular document.

FIG. 3 illustrates two examples of an article view of a particular document, in both small and large formats 301 and 302. The GUI of both formats includes a title bar 305 and 315. In the small format example 301, the GUI further includes a separate toolbar for interacting with (e.g., sharing, liking, bookmarking, etc.) the displayed article. The large format example 302 shows that the tools for interacting with the displayed article are included in the title bar 315.

In some embodiments, the layout of the article 370 in the article view is defined by the publishers in a special format that allows for flexible placement and styling of images and text, with rich formatting and animations to provide an enhanced multimedia experience. Although the body 320 of the article is shown with only text, in some embodiments, the article includes various other media (e.g., images, audio, cinemagraphs, other movies, etc.).

The displayed article 370 includes a playable video control 350 and the body 375 of the article. The body 375 of the article 370 includes the full content of the article. The full content of articles may include additional text, images, graphics, videos, and other elements that are not displayed in the document panes of the feed view. The playable video control 350 in this example is shown as a static thumbnail of a scene from the video with a play indicator 355 for playing the video. Selection of the play indicator 355 causes the video to play inline within the article view.

The videos to be displayed for a video document can be accessed from various different sources. In some embodiments, a provider (or publisher) for the video document includes a link (e.g., Uniform Resource Locator (URL), etc.) to a streaming video located on a server. In some embodiments, the server is managed by the publisher, while in other embodiments, the links may access third-party servers unrelated to the publisher. In some embodiments, the video links are stored in a header of the provided content to specify the video to be provided with an article.

In some embodiments, in addition to the videos designated by the provider, the document reader application of some embodiments presents pre-roll advertisements (i.e., advertisement videos presented prior to the requested video)

in the playable video controls (e.g., inline in a feed view, in a separate video control in an article view, in full-screen mode, etc.) of the application. In some embodiments, rather than specifying a single video, the videos designated by the provider may be a part of a playlist of videos, where a next video of the playlist is presented after the completion of each video. In some embodiments, the pre-roll advertisements are presented before each new video.

Figure 4:
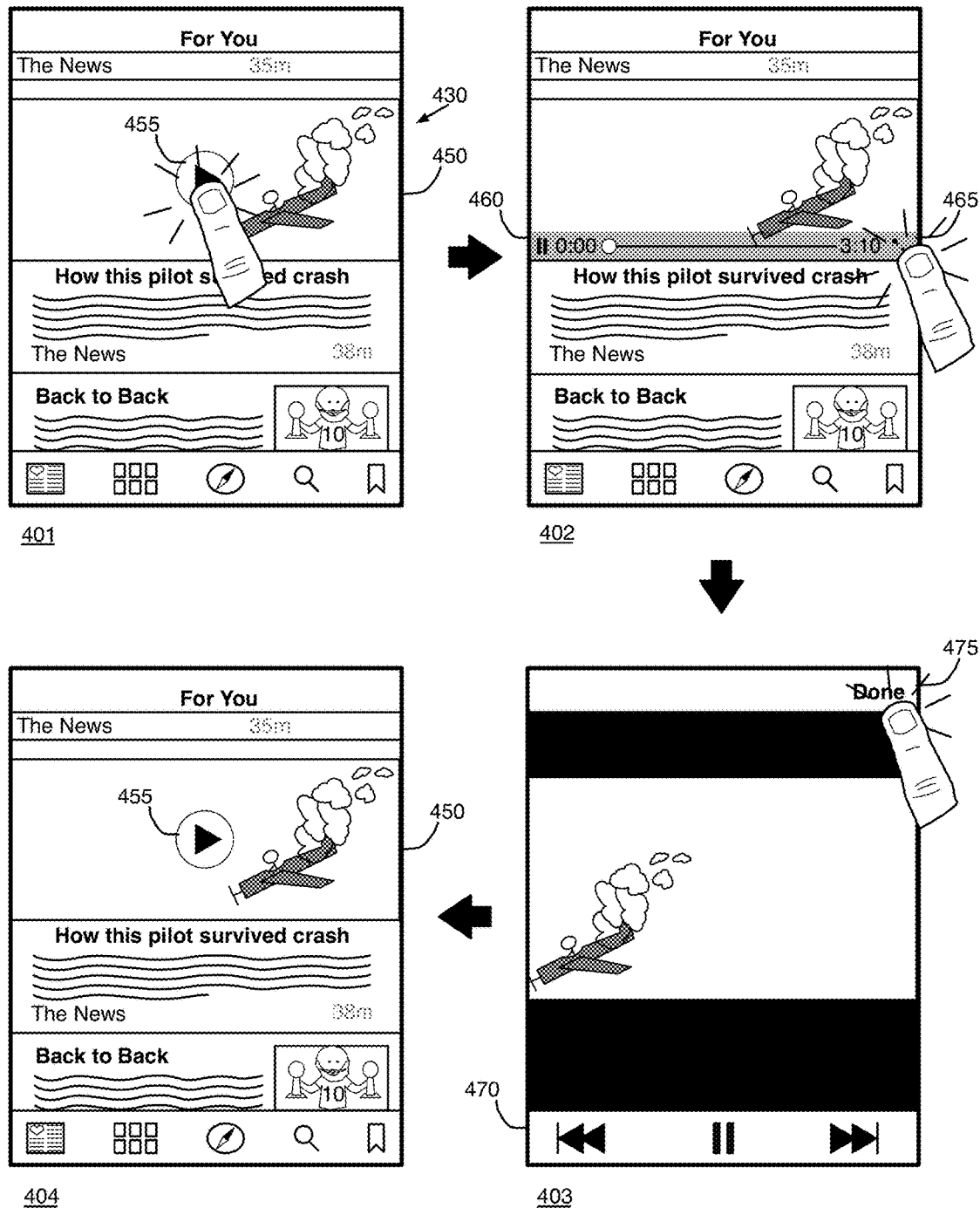
FIG. 4 illustrates an example of a video player element for displaying videos in document panes of a feed view and/or in the article view of a particular document.

FIG. 4 illustrates an example of a playable video control for displaying videos in document panes of a feed view and/or in the article view of a particular document in four stages 401-404. The first stage 401 shows a feed view with a video document pane 430 and a playable video control 450. In the first stage 401, the user selects the play indicator 455 to initiate the playback of the video.

In response to the selection of the play indicator 455, the second stage 402 shows that the video control 450 now shows a toolbar 460 with user interface (UI) elements for controlling the playing video. In this example, the toolbar 460 includes a time scrubber for navigating through the video, a pause element for pausing the video, and a full-screen element for showing a full-screen view of the video. The toolbar 460 may include additional or fewer elements in other embodiments. In some embodiments, the elements are not shown when playback for a video begins (i.e., when the play indicator is selected from a playable video control), but are only shown when a user provides additional input (e.g., a tap) during playback of the video. In this way, the toolbar and other elements do not interfere with the display of the video.

The second stage 402 also shows that the user selects the full-screen element of the toolbar 460, and the third stage 403 shows the video in a full-screen mode. The full-screen mode shows a different set of control elements including forward, backward, pause controls along the bottom toolbar 470. The full-screen mode also shows a Done control 475, which ends the full-screen mode to return to the feed view.

In some embodiments, the Done control ends the playback of the video, while in other embodiments, the Done control only ends the full-screen mode, while playback of the video continues in the feed view. In some embodiments, the Done control does not return to the feed view, but rather shows an article view for the selected video document pane. The fourth stage 404 shows that the GUI has returned to display a feed view with articles.

II. Navigation of Video Document Panes

Figure 5:
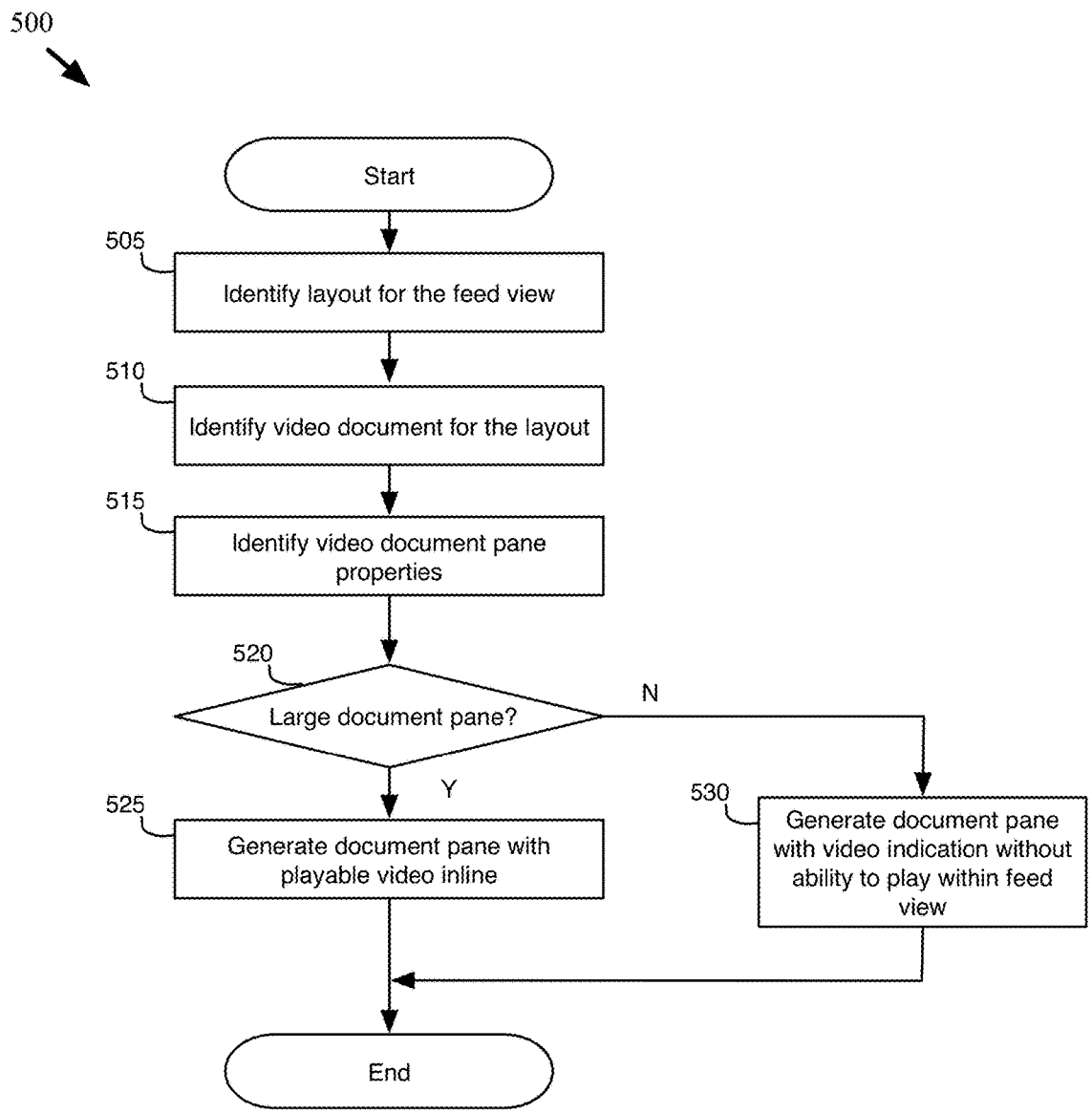
FIG. 5 conceptually illustrates a process for generating video document panes in a feed view for a document reader application.

FIG. 5 conceptually illustrates a process for generating video document panes in a feed view for a document reader application. The process 500 of some embodiments is performed by a layout manager of the document reader application when a feed view (or summary view) is to be displayed for a set of documents. The process 500 identifies (at 505) a layout for the feed view to be displayed in the GUI of the document reader application. The layout identifies locations, sizes, and other information regarding how the different document panes will be aligned with each other.

The process 500 then identifies (at 510) a video document for the layout. The video document may be identified from a link or URL that is included in the description or metadata for a particular video document. The process 500 then identifies a set of properties for the video document pane that is to be generated for the particular video document. The set of properties include layout information for the document pane itself (i.e., how the various elements within the individual document pane are to be arranged), as well as size information.

At 520, the process 500 determines whether the size of the video document pane is a large pane (or whether the space within the document pane allocated for a video indicator or video control is large). When the process 500 determines that the document pane is large, the process 500 generates (at 525) a video document pane with a playable video control that allows the video to be played inline in the feed view. In some embodiments, the process 500 uses a single video player that is shared between the feed and article views, allowing for continuous playback of the video when transitioning between the different views. The process 500 then ends.

When the process 500 determines that the document pane is not large (i.e., is too small to play the video), the process generates (at 530) a video document pane with a video indicator to indicate that there is an associated video with the particular video document pane. However, the video indicator does not allow for inline play of the video. In some embodiments, the video indicator links to the article view for the video document and allows the video to auto-play when the video indicator of the video document pane is selected. In some embodiments, the process 500 determines whether to use a video indicator or a playable video control based, not only on the size of the panel, but also on the size allocated for video within the video document panel. The process 500 then ends.

Figure 6:
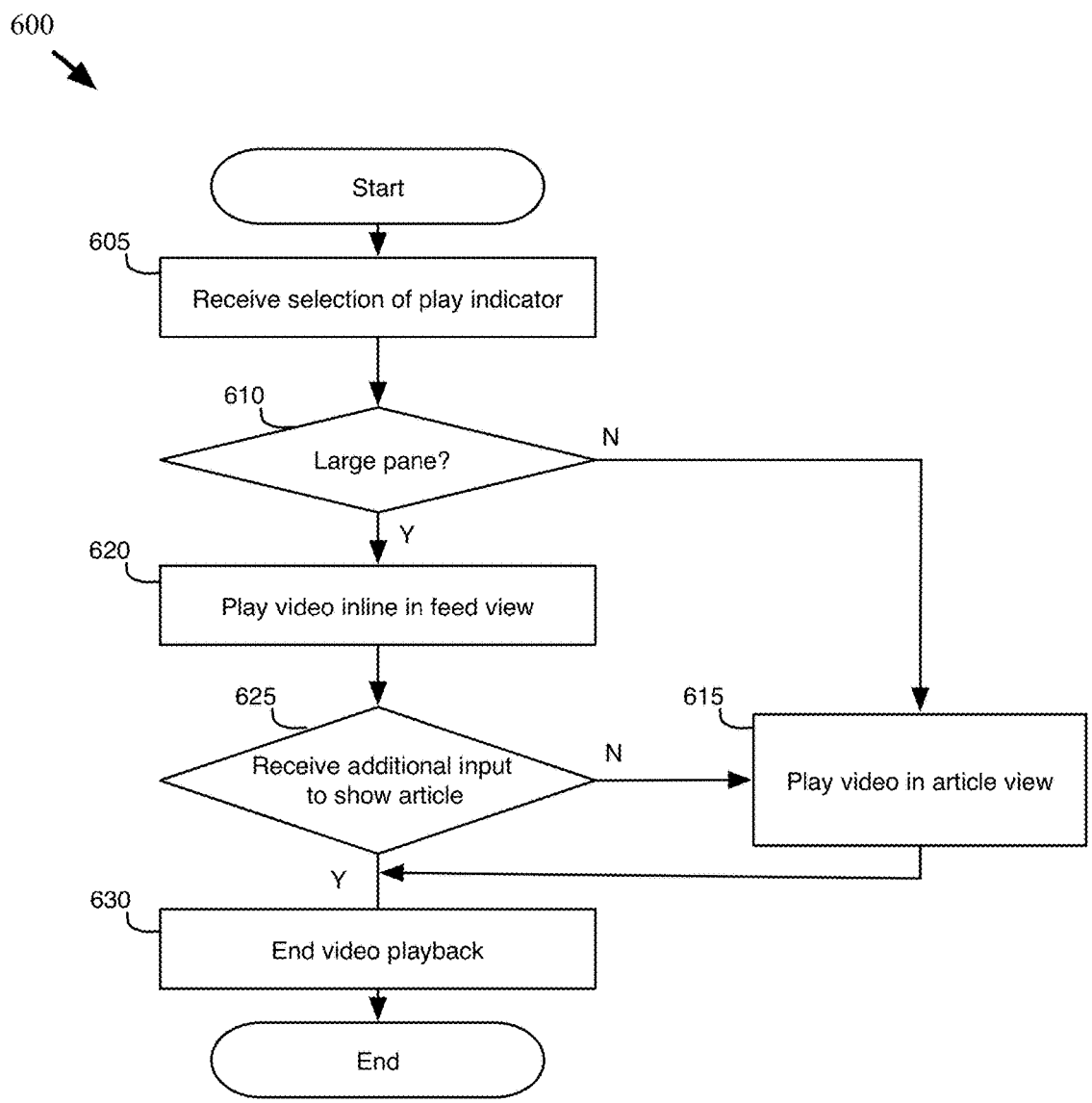
FIG. 6 conceptually illustrates a process for differently displaying video from a feed view based on a size of the document pane.

FIG. 6 conceptually illustrates a process for differently displaying video from a feed view based on a size of the document pane. In some embodiments, the process 600 of FIG. 6 is performed through a feed view interface generated according to the process 500 of FIG. 5. The process 600 begins by receiving (at 605) selection of a play indicator. In some embodiments, the play indicator is used to indicate that a particular thumbnail image or other control has an associated video, and allows the user to initiate playback of the video. The play indicator of some embodiments is a control within a thumbnail image from the video, while in other embodiments, the entire thumbnail image is used as the play indicator and selection of any area of the thumbnail image initiates playback of the video.

The process 600 then determines (at 610) whether the selected play indicator is from a large pane. Alternatively, or conjunctively, the process 600 determines whether there is sufficient space in the document pane to display the video inline. When the process 600 determines (at 610) that there is not sufficient space, the process plays (at 615) the video in an article view for the selected document. The article view of some embodiments shows the full content of the article and provides sufficient space to display the video.

When the process 600 determines (at 610) that there is sufficient space, the process plays (at 620) the video inline, within the feed view. The process 600 then determines (at 625) whether additional input (e.g., selection of the body of the video document pane) is received from the user to show the full content of the article associated with the video that is playing inline. When such additional input is received, the process 600 plays (at 615) the video in the article view of the selected document.

In some embodiments, the transition between the feed view and the article view does not interrupt the playback of the video. The video of some embodiments is played in a single playable video control that allows the continuous playback of the video as the document reader application transitions between the feed view and the article view for a particular document.

When the process 600 determines (at 625) that no additional input is received, or when the video completes in the article view (at 615), the process 600 ends the video playback. The process 600 then ends.

Figure 7:
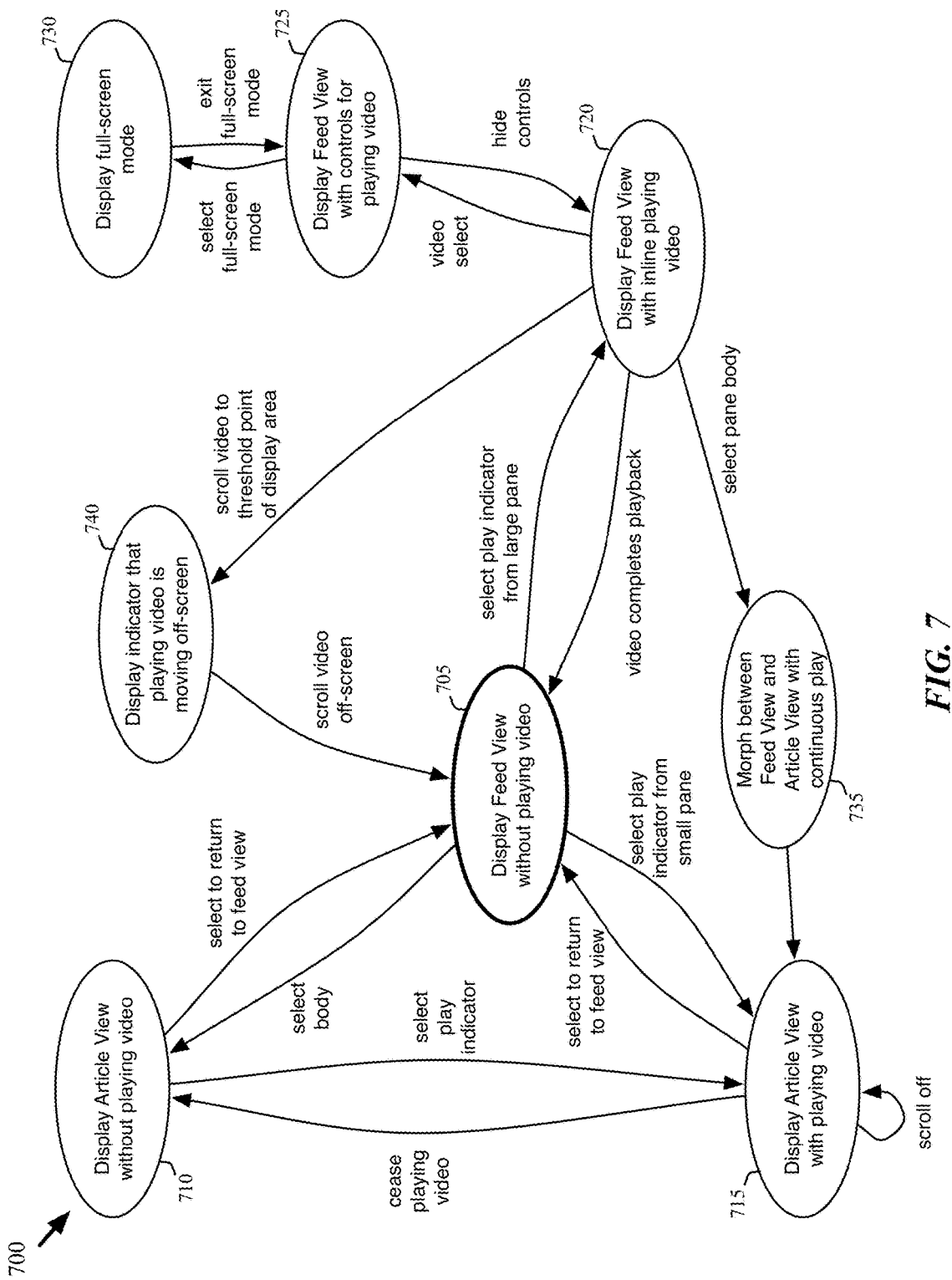
FIG. 7 conceptually illustrates a state diagram showing states and changes in the state for a document reader application of some embodiments.

The document reader application of some embodiments provides various functions and views to provide a pleasant experience for users as they view video documents. The different views and functions of the document reader application can be described in terms of states and user interactions. FIG. 7 conceptually illustrates a state diagram showing states and changes in the state for a document reader application of some embodiments. One of ordinary skill will recognize that this state diagram does not cover every possible interaction with the document reader, and that some interactions shown in the state diagram may not be provided in every embodiment of the invention. The state diagram will be described by reference to FIGS. 8-12, which illustrate various interactions with the document reader application.

The document reader application of some embodiments provides various different feed views for articles that are to be presented to a user of the application. In some embodiments, the feed view, such as the ones described with reference to FIGS. 1 and 2, is a default view that is provided when the application is first opened by the user, while in other embodiments, the user navigates to the feed view through other methods (e.g., manually selecting a feed view for a publisher, topic, etc.). State 705 describes the state of the application in a feed view, in which none of the videos are playing inline (e.g., are not auto-playing and have not been manually selected to play).

As described above, the video document panes of some embodiments include a body and a video representation (i.e., either a thumbnail video indicator or a playable video control) with a play indicator. While in state 705, when the user selects the body of a video document pane, the application transitions to state 710 to display an article view (as described above with reference to FIG. 3) of the selected video document. When the user selects the body of the video document pane, the article view of the selected video document does not automatically play the corresponding video. In some embodiments, the document reader application transitions to state 710 regardless of the size of the video document pane. From the article view, the user can select the play indicator to transition to state 715 to play the video in the article view or return to the feed view (e.g., using a back button).

Figure 8:
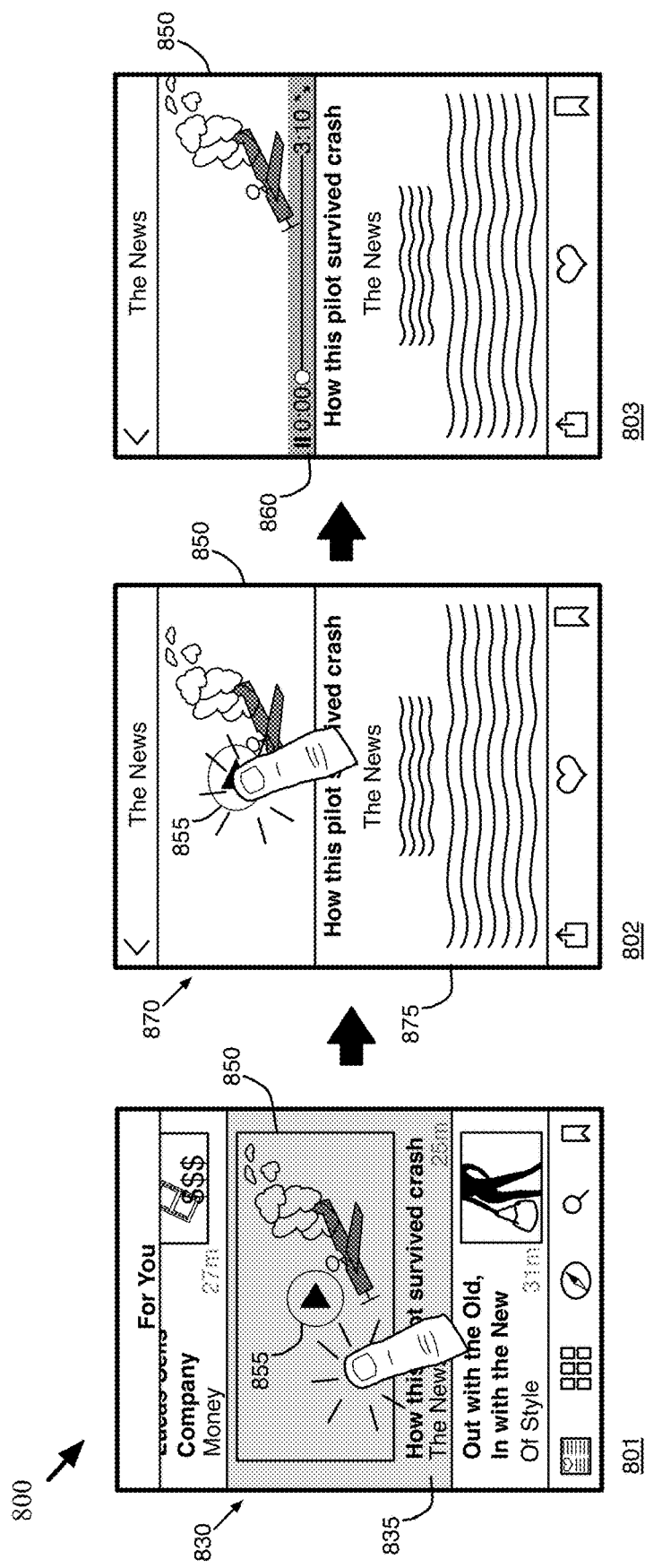
FIG. 8 illustrates an example of navigating between a feed view and an article view for a video document pane.

FIG. 8 illustrates an example of navigating between a feed view and an article view for a video document pane in three stages 801-803. In the first stage 801, the GUI 800 shows a feed view with multiple document panes. In particular, the GUI 800 shows a video document pane 830, with playable video control 850 and play indicator 855. The first stage 801 also shows that the user has selected the playable video control 850 for the video document from the feed view. In this example, selection of the video indicator 825 is treated like selection of the body of the video document pane leading to an article view of the video document, whereas selection of the play indicator 855 would have a different result, as described below. In other embodiments, the video indicator 825 is considered a part of the play indicator 850 rather than a part of the body 830 of the video document pane 810.

The second stage 802 shows that as a result of selecting the body of the video document pane 830, the GUI 800 displays an article view 870 of the video document. Like the document pane 830 of the feed view in the first stage 801, the article view 870 includes the playable video control 850, play indicator 855, and a full content body 875 for the document. However, in the article view 870, the playable video control 850 has been resized and is larger to fit with the layout of the article, while the body 830 includes the full content of the document. Since the user selected the body (i.e., the playable video control 850) of the document pane, rather than the play indicator 855, the video does not automatically play in the article view 870.

The second stage 802 also shows that the user selects the play indicator 855 from the playable video control 850 of the article view 870. The third stage 803 shows that, in response to the selection of the play indicator 850, the video begins to play in the video control 850 of the article view 870. In this example, when the video begins to play, a toolbar 860 shows a set of UI elements for manipulating (e.g., pausing, going full-screen, etc.) the playing video, as described above with reference to FIG. 4. In some embodiments, the toolbar 860 is not shown when the video begins to play, but is only shown upon further input (e.g., a tap) from the user.

Figure 9:
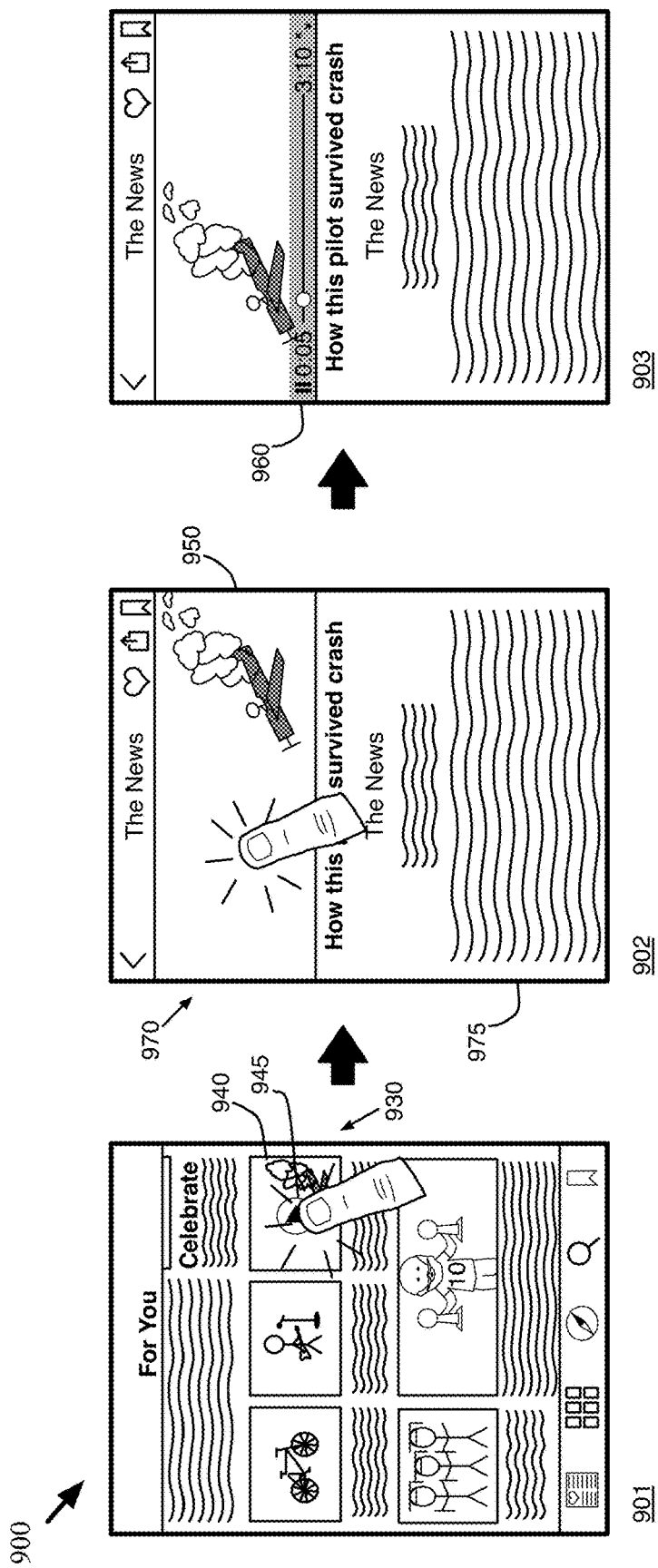
FIG. 9 illustrates an example of playing video for a small video document pane.
Figure 10:
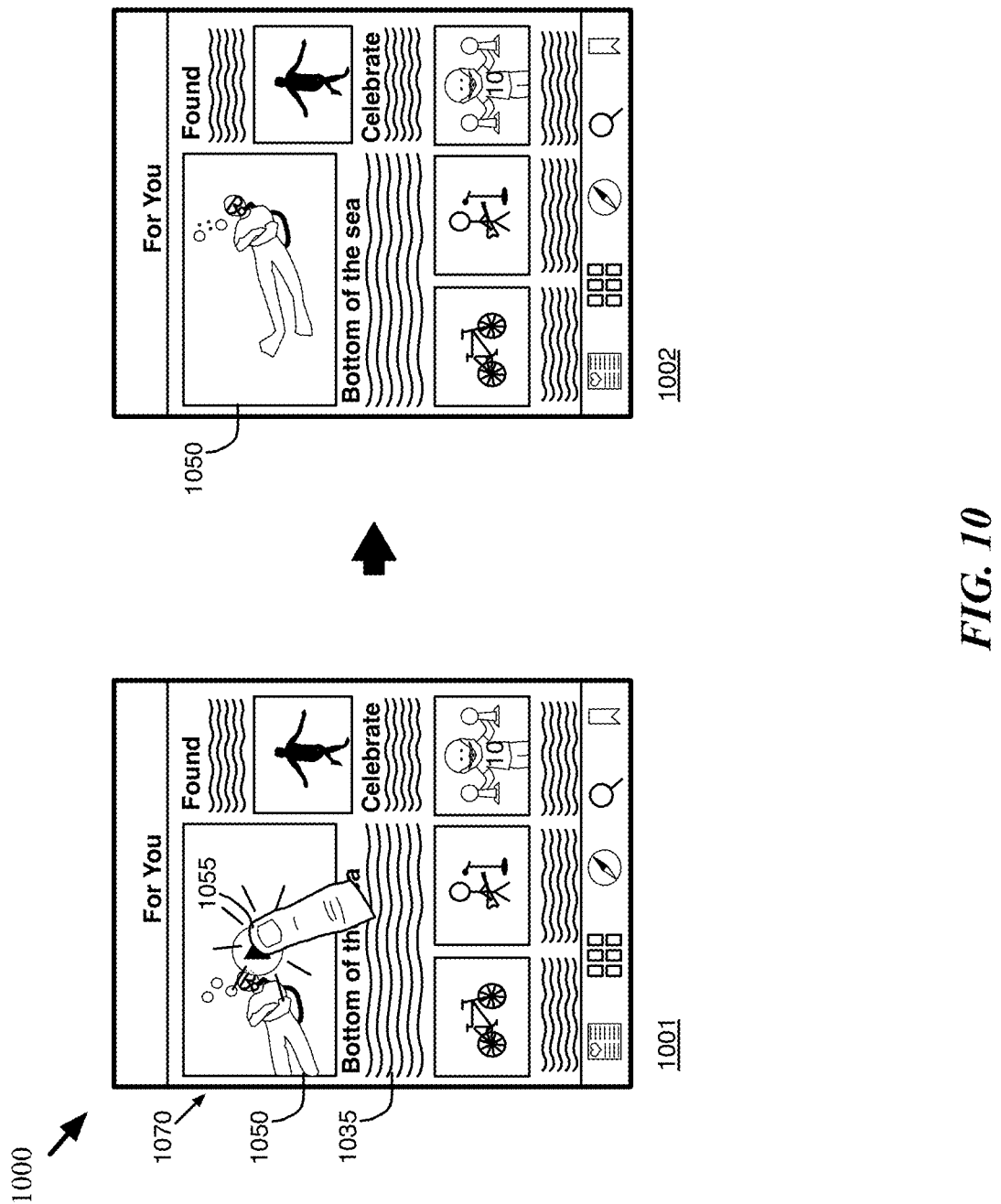
FIG. 10 illustrates an example of playing video for a large video document pane.

In some embodiments, the document reader application transitions to different states when the play indicator of a video document pane is selected versus when the body of the video document pane is selected, or when the play indicator of a small-format document pane is selected versus a large-format document pane. Referring back to FIG. 7, the state diagram 700 shows that, while in state 705 with the feed view and no playing video, the application transitions directly to state 715 (the article view with playing video) when the play indicator is selected in a small-format video document pane, but transitions to state 720 (the feed view with inline playing video) when the play indicator is selected from a large-format video document pane. FIGS. 9 and 10 illustrate the different transitions based on the size of the video document panes.

The document reader application transitions from the feed view of state 705 directly to state 715 when the play indicator is selected in a small-format video document pane. FIG. 9 illustrates an example of playing video for a small video document pane in three stages 901-903. The first stage 901 shows a feed view with multiple document panes. In particular, one of the document panes is a small video document pane 930, with a thumbnail video indicator 940 and a play indicator 945.

In the first stage 901, the user selects the play indicator 945 to play the video. However, in this example, the thumbnail video indicator 940 for the video document pane is too small to display the video inline. Instead, the second stage 902 shows that, upon selection of the play indicator 945, the document reader application goes directly to the article view of the article. The article view is similar to the article views described above, however, in this case, the video is automatically played in video control 950 as the article view loads. In this manner, selection of the play indicator by the user directly leads to the playing of the video, while also allowing the user to view the video at a reasonable resolution in the article view.

In this example, the video automatically begins playback in the second stage 902, but the video does not immediately display the controls on a toolbar. Rather, the second stage 902 shows that the user taps on the video control 950, in order to bring up the toolbar 960 as shown in the third stage 903.

In the example of FIG. 9, the document reader application transitions from the feed view to an article view for the selected video document. As the user has indicated a desire to view the video, the document reader application of some embodiments auto-plays the video in the article view, allowing the user to view a larger version of the video while also viewing the full content of the article. In some embodiments, rather than going directly to the article view, the document reader application of some embodiments transitions to a full-screen mode when the play indicator is selected for a small pane. When the user exits the full-screen mode (e.g., by ending the video or when the video ends), the document reader application of some embodiments then transitions directly to state 710, displaying the article view without the playing video. In some embodiments, when full-screen mode is ended, but the video is not complete, the application instead transitions directly to state 715 to display the article view with the playing video, without interrupting the playback of the video.

When the play indicator is selected in a large-format video document pane, the document reader application transitions from the feed view of state 705 to state 720, which displays a feed view that plays the video inline. FIG. 10 illustrates an example of playing video for a large-format video document pane in two stages 1001 and 1002. In this example, the first stage 1001 shows a feed view for a set of articles, with document panes of various sizes. In particular, the first stage 1001 shows a large video document pane 1070 (e.g., an 8-column layout) with playable video control 1050, body 1035, and play indicator 1055. In the first stage 1001, a user selects play indicator 1055. As the space for the video is large enough to present the video, the second stage 1002 shows that the video begins to play inline (i.e., within the feed view).

Referring back to FIG. 7, in some embodiments, selection of the playing video control transitions from state 720 to state 725, which shows video controls for the playing video, as described above with reference to FIG. 4. Selection of a full-screen UI element transitions to state 730, which displays the video in a full-screen mode, until the full-screen mode is ended or the video ends.

Figure 11:
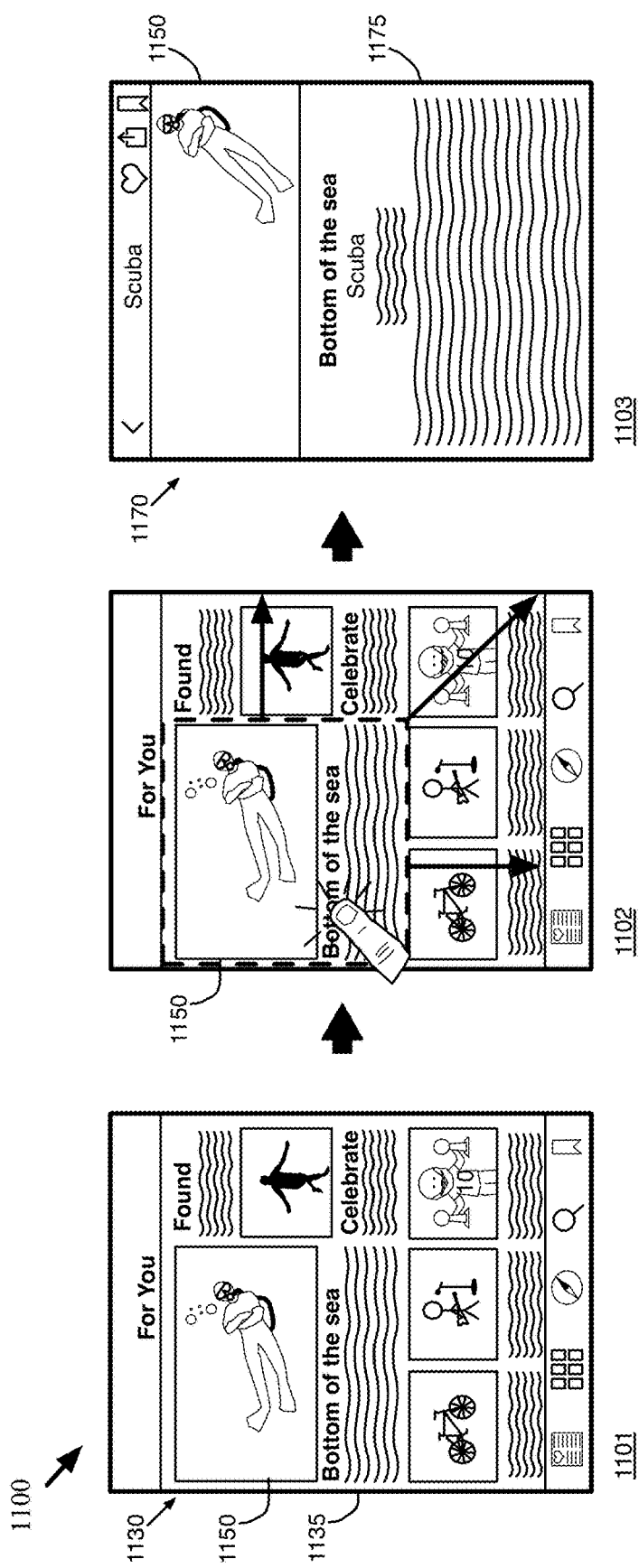
FIG. 11 illustrates an example of continuous play of a video from the feed view to the article view for a video document.

In some embodiments, when the video is playing inline in a video document pane of the feed view (i.e., state 720), the user can select the body of the video document pane to transition to an article view of the video document without interrupting the playing video. FIG. 11 illustrates an example of continuous play of a video from the feed view to the article view for a video document. The first stage 1101 is the same as the last stage 1002 of FIG. 10, and shows the video playing inline in a video control 1150 of the document pane 1130, shown in the feed view of the GUI 1100 of the document reader application.

In the second stage 1102, the video continues to play inline and the user selects the body 1135 of the video document pane 1130 to read the full content of the article. In some embodiments, the document reader of some embodiments provides animations between the feed views and the article views for the video documents.

In response to the selection of the body of the document pane, the second stage 1102 also shows that the video document pane 1130 of the feed view transitions to an article view (article view 1170 in the third stage 1103) for the selected document. The layout of the article view for a document of some embodiments is based on a configuration of the article, with the placement and size of the video dictated by the publisher or provider of the content. In some embodiments, the GUI 1100 zooms into the selected article as the neighboring articles expand and are pushed out of the display area. The third stage 1103 shows that the video control 1150 is scaled to grow and move toward its final spot within the article view 1170. In some embodiments, the video continues to play through the transition between the feed view and the article view. In order to maintain continuous play between the feed view and the article view, the document reader application of some embodiments uses a single video player (or control) between the various views.

Figure 12:
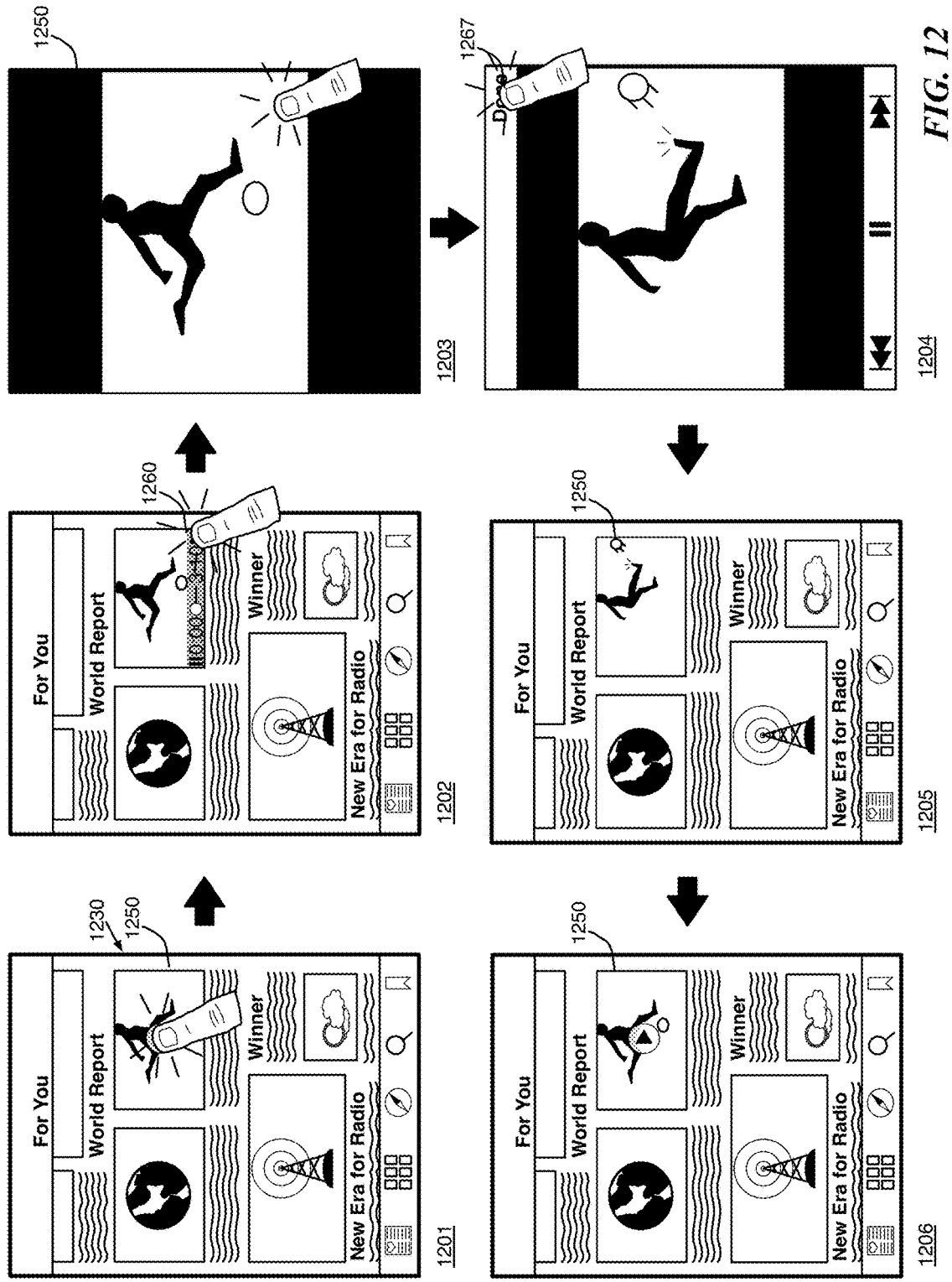
FIG. 12 illustrates an example of continuous play of a video between the feed view and a full-screen view.

FIG. 12 illustrates an example of continuous play of a video between the feed view and a full-screen view in six stages 1201-1206. The first stage 1201 shows a feed view that shows document panes for several different articles, including a large video document pane 1230 with a playable video control 1250. In the first stage 1201, the user selects the play indicator of the video control 1250 to begin playing the video inline. In the second stage 1202, the GUI shows that the video has begun playing. In addition, inline video shows a toolbar 1260. As described above, the toolbar 1260 of some embodiments is shown when the video begins to play, while in other embodiments, the inline videos are initially shown without video controls. The second stage 1202 also shows the user selects a full-screen UI element on the inline video control 1250.

The third stage 1203 shows that the GUI now displays the video control 1250 in a full-screen mode. The full-screen mode of some embodiments takes up the entire display area of the device. In the third stage 1203, the user taps on the video control 1250 to show the UI elements for navigating the video, as shown in the fourth stage 1204. In the fourth stage 1204, the user selects the Done control 1267 to close the full-screen mode. In some embodiments, the Done control 1267 stops playback of the video. However, in this example, the Done control 1267 only closes the full-screen mode, but does not stop playback of the video. Accordingly, in the fifth stage 1205, the video control 1250 continues to play the video until the video ends. In the sixth stage 1206, the video has ended and the video control 1250 displays a static thumbnail image from the video with the play indicator 1250.

Figure 13:
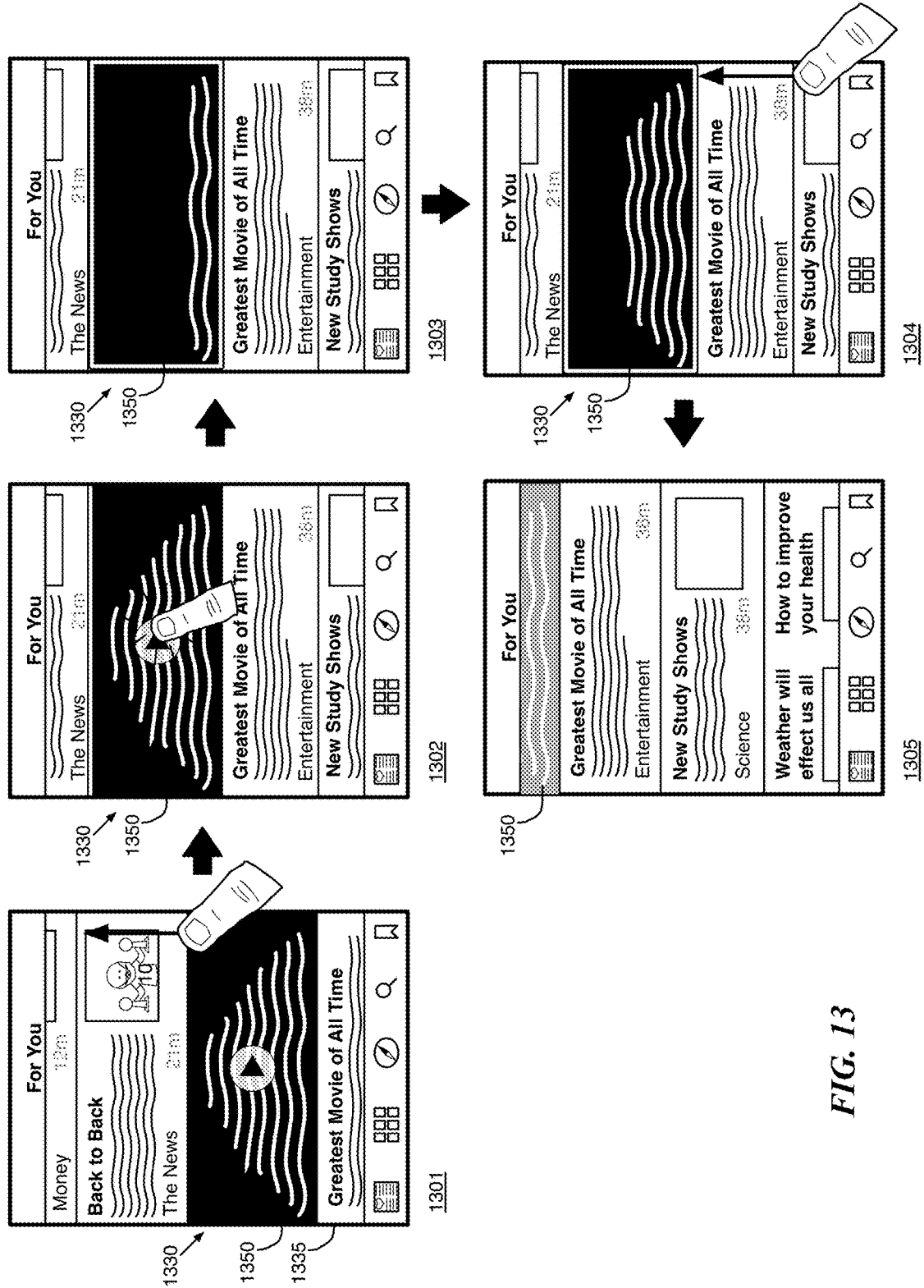
FIG. 13 illustrates an example of transitions for a document pane upon scrolling the document pane from the displayed area of a mobile device.

In addition to providing different types of video document panes and methods for navigating them, the document reader application of some embodiments provides for additional methods for viewing and controlling video content. FIG. 13 illustrates an example of transitions for a document pane upon scrolling the document pane from the displayed area of a mobile device in five stages 1301-1305. The first stage 1301 shows a feed view with a video document pane 1330 with a video control 1350 and a body 1335. In the first stage 1301, the user scrolls up to show the video document pane 1330 in the display area.

The second stage 1302 shows the video document pane 1330 is fully displayed and that the user selects the play indicator of the video document pane 1330 to initiate playback of the associated video. In the third and fourth stages 1303 and 1304, the video begins to play inline within the video control 1350 of the video document pane 1330. The fourth stage 1304 also shows that the user scrolls up to show additional content of the feed (e.g., document panes for other documents), scrolling the playing video in the video control 1350 off-screen.

In some embodiments, when a video is playing in the feed view and is scrolled out of the display area, the document reader application stops (or pauses) the video and provides a visual indicator that indicates that the video is no longer playing. The fifth stage 1305 shows that as the video for the video document pane is nearly scrolled off-screen (e.g., when the bottom of the pane reaches a threshold point in the display area), the video fades to gray to indicate that the video is stopping. Alternatively or conjunctively, the document reader application of some embodiments provides an audio indication by fading the audio associated with the video.

In addition to pausing the video as the video content is scrolled off-screen, the document reader application of some embodiments automatically starts playback of a video when it is brought on-screen. In some such embodiments, auto-played video content plays with no sounds, but provides a basic set of controls for controlling the video (e.g., unmute, pause, full-screen mode, etc.). In other embodiments, the video content only plays when the user selects the play indicator of the video document pane. In some embodiments, the document reader application does not automatically play videos for most of the video document panes, but provides a special full-screen video document pane that does play automatically when it is brought on to the screen.

Figure 14:
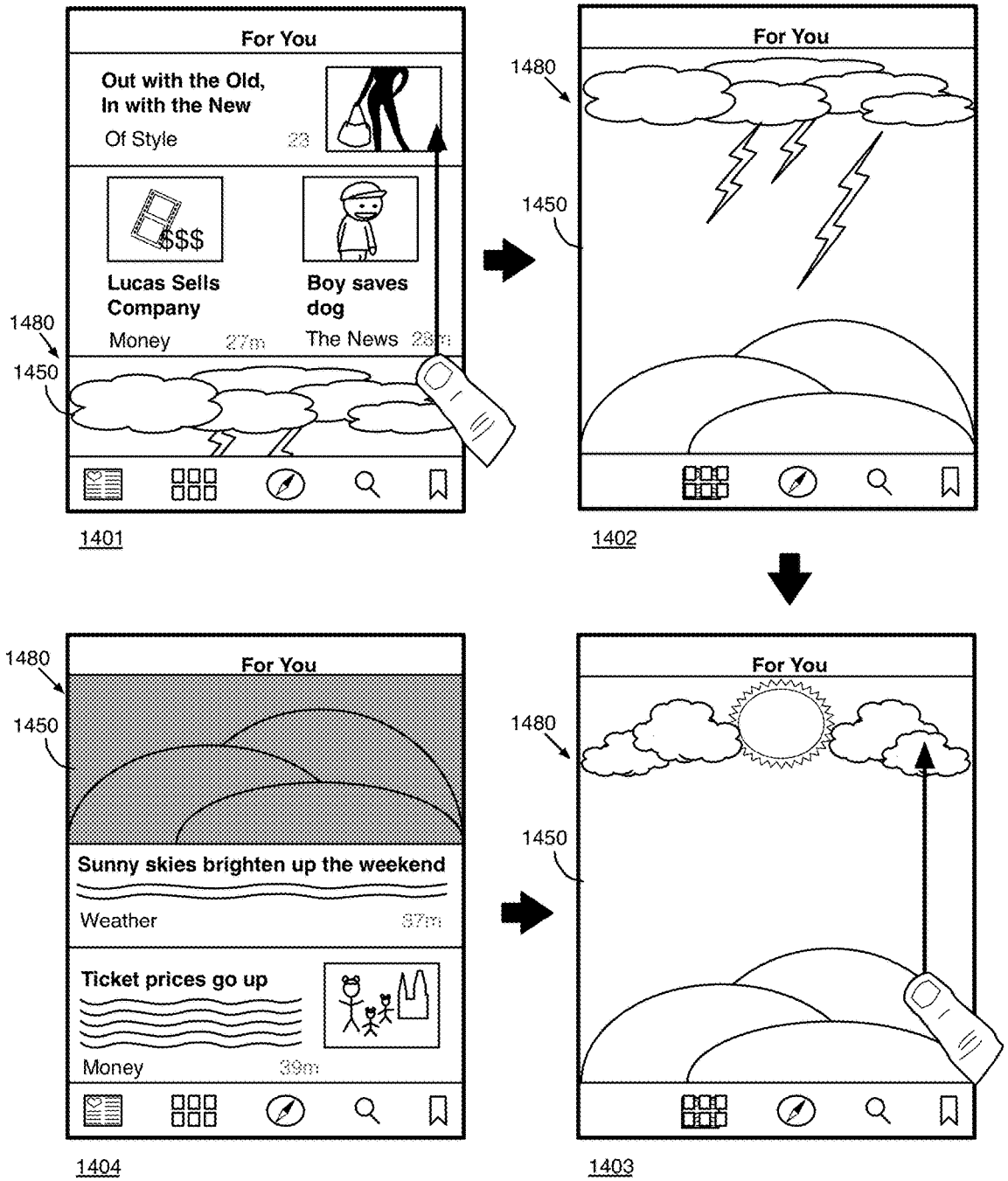
FIG. 14 illustrates an example of scrolling to new video content in the feed view.

FIG. 14 illustrates an example of scrolling to new video content of a full-screen video document pane in the feed view in four stages 1401-1404. The first stage 1401 shows a user scrolling through a feed view. At the bottom of the display is a full-screen video document pane 1480 with a video control 1450. The document reader application of some embodiments sizes the video control 1450 and the full-screen video document pane 1480 to match the available display area of the device. In the second stage 1402, the user has scrolled the full-screen video document pane 1480 into the display area. In some embodiments, the document reader application snaps the top of a full-screen video document pane 1480 to the top of the display area when it reaches a threshold distance from the top of the display area.

In addition to snapping to fit the display area, the second stage 1402 shows that the video automatically begins to play. In the third stage 1403, the video continues to play. In addition, the third stage 1403 shows that the user scrolls past the full-screen video document pane 1480 to show document panes for other articles in the feed view.

Similar to the example described above with reference to FIG. 13, when a video is playing in the video control 1450 of the full-screen video document pane 1480, and is scrolled out of the display area, the document reader application of some embodiments stops (or pauses) the video and provides a visual indicator that indicates that the video is no longer playing. The fourth stage 1404 shows that as the video for the full-screen video document pane is scrolled off-screen (e.g., when the bottom of the pane reaches a threshold point in the display area), the video fades to gray to indicate that the video is stopping. In some embodiments, in addition to the visual indication, the document reader application provides an audio indication by fading the audio associated with the video.

While videos in the feed view of some embodiments are paused or stopped when they are scrolled off-screen, videos in the article view of some embodiments continue to play even as a user scrolls through the article. This allows the user to listen to the audio of the video content, while reading through the article. In some embodiments, rather than scrolling the video off-screen, the video continues to play and maintains a position on the screen, to allow the user to see and listen to the video content while reading through the article text.

Figure 15:
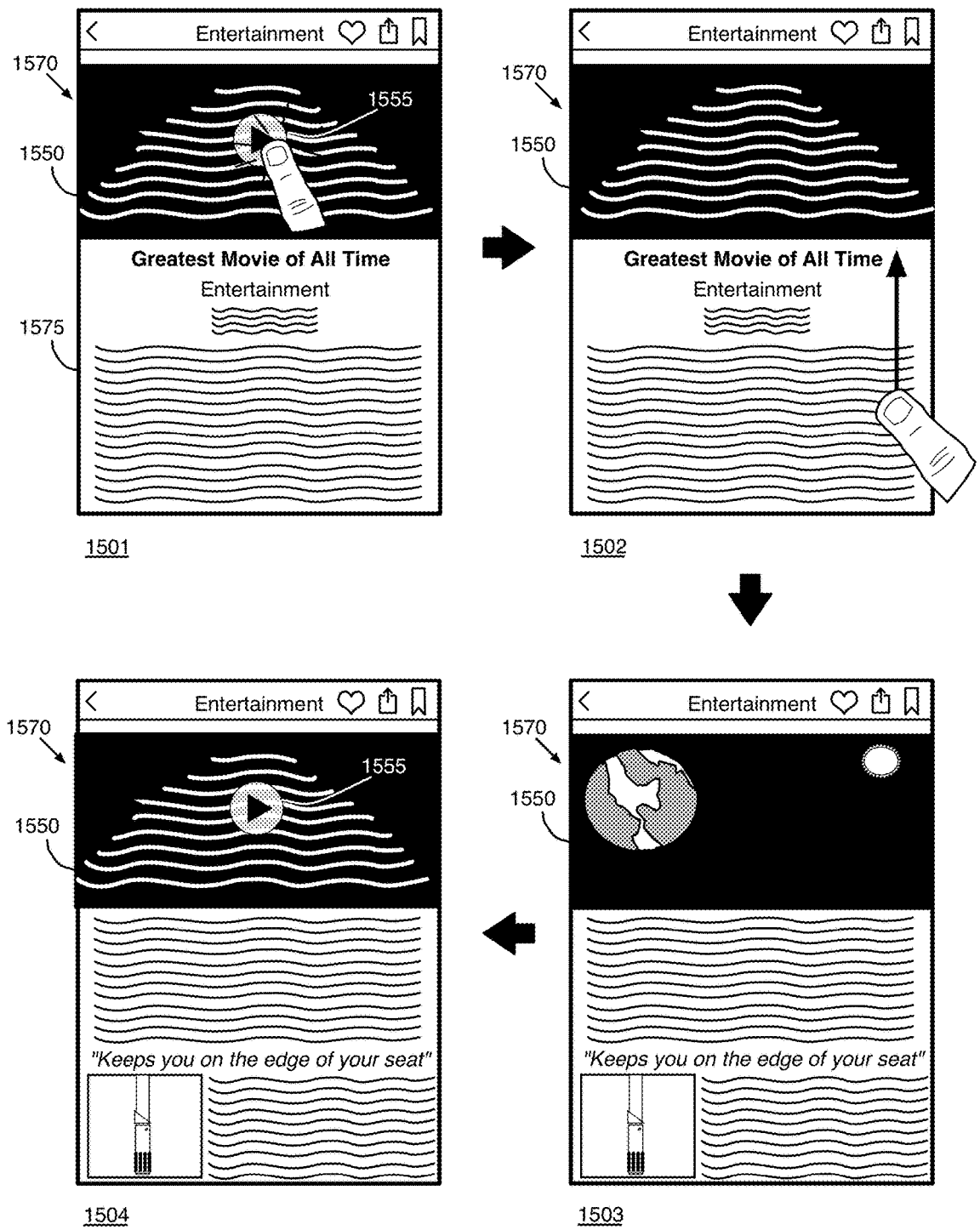
FIG. 15 illustrates an example of scrolling through an article with video content.

FIG. 15 illustrates an example of scrolling through an article view for a document with video content in four stages 1501-1504. The first stage 1501 shows an article view 1570 with a body 1575 and a video control 1550. The body 1575 of the article in this example shows the title, topic, and content of the article. The video control 1550 is not yet playing, and shows a play indicator 1555. In the first stage 1501, the user selects the play indicator 1555 to begin playback of the video.

The second stage 1502 shows that the video has begun its playback. In addition, the user scrolls through the body of the article to read more of the associated text. The third stage 1503 shows that additional text is shown in the body of the article, along with an image and quotes. However, rather than scrolling the video off-screen, the third stage 1503 shows that the video control 1550 of the article view maintains its position at the top of the article view 1570 and continues to play as the user scrolls through the article.

Finally, in the fourth stage 1504, the video completes and the video control 1150 returns to the static image with the play indicator 1555, allowing the user to continue reading the article, to replay the video, or to return to a feed view.

The document reader application of some embodiments provides various features and methods for navigation for video content documents. The navigation between a feed view and an article view of some embodiments depends on the size of the video document panes, and allows for continuous or automatic playback of the video content for a selected document.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 16:
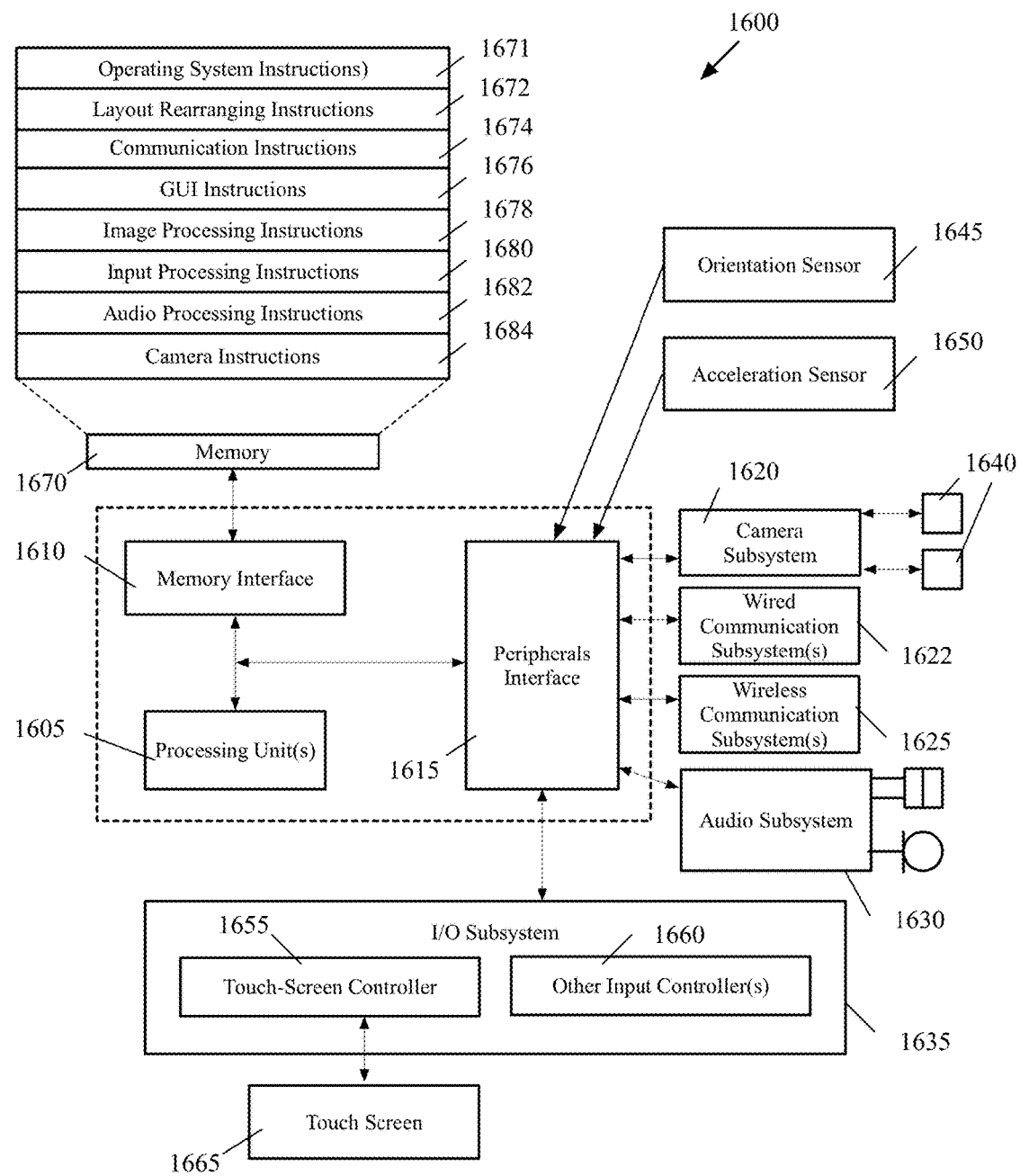
FIG. 16 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 16 is an example of an architecture 1600 of such a mobile computing device. As shown, the mobile computing device 1600 includes one or more processing units 1605, a memory interface 1610 and a peripherals interface 1615.

The peripherals interface 1615 is coupled to various sensors and subsystems, including a camera subsystem 1620, a wired communication subsystem(s) 1623, a wireless communication subsystem(s) 1625, an audio subsystem 1630, an I/O subsystem 1635, etc. The peripherals interface 1615 enables communication between the processing units 1605 and various peripherals. For example, an orientation sensor 1645 (e.g., a gyroscope) and an acceleration sensor 1650 (e.g., an accelerometer) is coupled to the peripherals interface 1615 to facilitate orientation and acceleration functions.

The camera subsystem 1620 is coupled to one or more optical sensors 1640 (e.g., a charged coupled device (CCD) optical sensor, a complementary metal-oxide-semiconductor (CMOS) optical sensor, etc.). The camera subsystem 1620 coupled with the optical sensors 1640 facilitates camera functions, such as image and/or video data capturing. The wired communication subsystem 1623 and wireless communication subsystem 1625 serve to facilitate communication functions.

In some embodiments, the wireless communication subsystem 1625 includes radio frequency receivers and transmitters, and optical receivers and transmitters (not shown in FIG. 16). These receivers and transmitters of some embodiments are implemented to operate over one or more communication networks such as a GSM network, a Wi-Fi network, a Bluetooth network, etc. The audio subsystem 1630 is coupled to a speaker to output audio (e.g., to output voice navigation instructions). Additionally, the audio subsystem 1630 is coupled to a microphone to facilitate voice-enabled functions in some embodiments.

The I/O subsystem 1635 involves the transfer between input/output peripheral devices, such as a display, a touch screen, etc., and the data bus of the processing units 1605 through the peripherals interface 1615. The I/O subsystem 1635 includes a touch-screen controller 1655 and other input controllers 1660 to facilitate the transfer between input/output peripheral devices and the data bus of the processing units 1605. As shown, the touch-screen controller 1655 is coupled to a touch screen 1665. The touch-screen controller 1655 detects contact and movement on the touch screen 1665 using any of multiple touch sensitivity technologies. The other input controllers 1660 are coupled to other input/control devices, such as one or more buttons. Some embodiments include a near-touch sensitive screen and a corresponding controller that can detect near-touch interactions instead of or in addition to touch interactions.

The memory interface 1610 is coupled to memory 1670. In some embodiments, the memory 1670 includes volatile memory (e.g., high-speed random access memory), non-volatile memory (e.g., flash memory), a combination of volatile and non-volatile memory, and/or any other type of memory. As illustrated in FIG. 16, the memory 1670 stores an operating system (OS) 1671. The OS 1671 includes instructions for handling basic system services and for performing hardware dependent tasks. The memory 1670 additionally includes layout rearranging instructions 1672 in order for the device 1600 to perform the layout rearranging process of some embodiments. In some embodiments, these instructions 1672 may be a subset of the operating system instructions 1671, or may be part of the instructions for an application.

The memory 1670 also includes communication instructions 1674 to facilitate communicating with one or more additional devices (e.g., for peer-to-peer data sharing, or to connect to a server through the Internet for cloud-based data sharing); graphical user interface instructions 1676 to facilitate graphic user interface processing; image processing instructions 1678 to facilitate image-related processing and functions; input processing instructions 1680 to facilitate input-related (e.g., touch input) processes and functions; audio processing instructions 1682 to facilitate audio-related processes and functions; and camera instructions 1684 to facilitate camera-related processes and functions. The instructions described above are merely exemplary and the memory 1670 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 16 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 16 may be split into two or more integrated circuits.

B. Computer System

Figure 17:
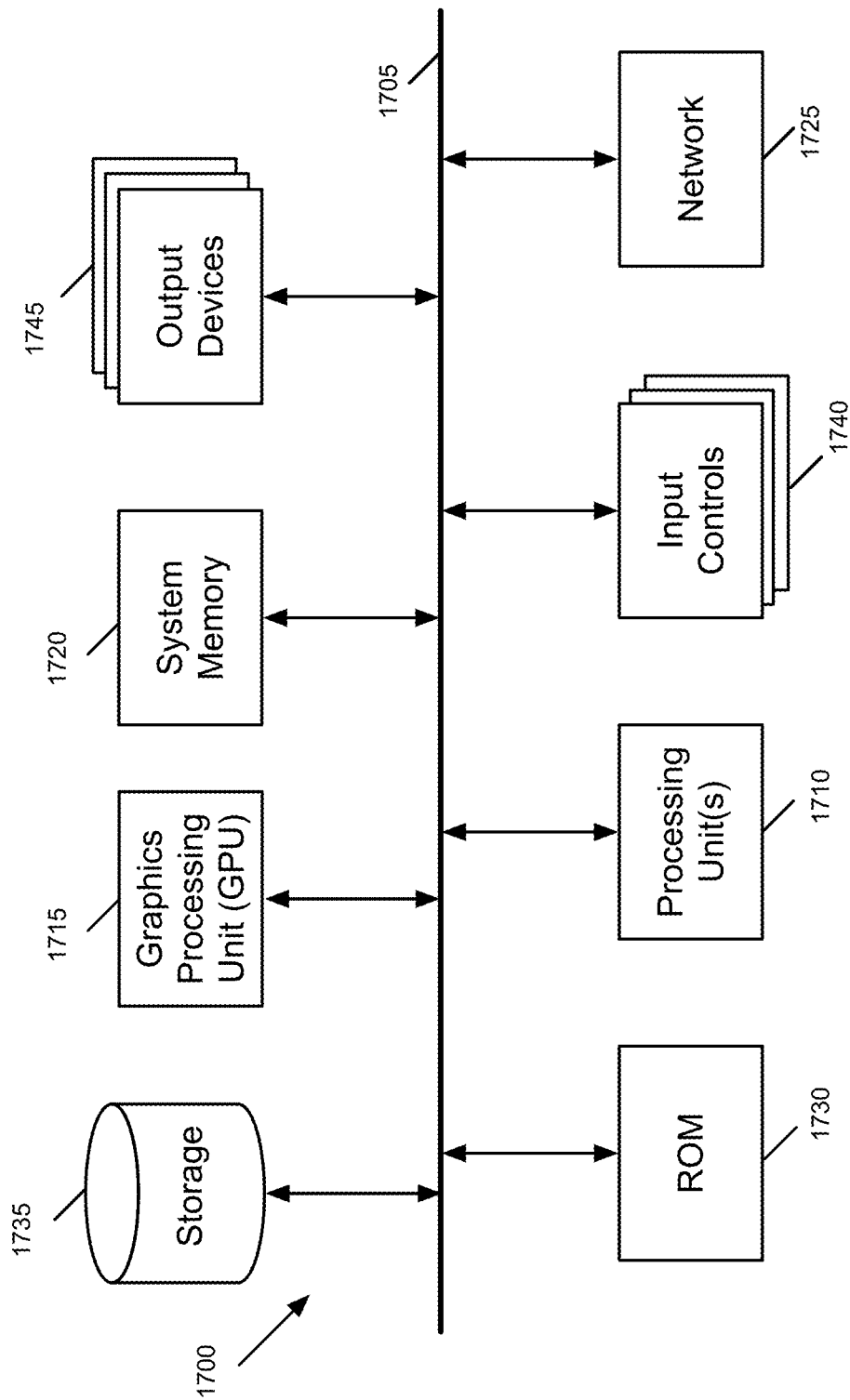
FIG. 17 conceptually illustrates another example of an electronic system with which some embodiments of the invention are implemented.

FIG. 17 conceptually illustrates another example of an electronic system 1700 with which some embodiments of the invention are implemented. The electronic system 1700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710. In some embodiments, such functionality can be provided using CoreImage's kernel shading language.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive, integrated flash memory) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile readand-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet), or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 5 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program which when executed by at least one processing unit of a device generates a set of video document panes for a set of video documents, each video document comprising video content and other media content, the program comprising sets of instructions for:
   identifying the set of video documents to be presented in a particular mode;
   for each video document:
      identifying a set of properties for the video content and the other media content of the video document;
      identifying a pane layout based on the set of properties for displaying a summarized view of the video document;
      determining whether the identified pane layout meets a set of criteria;
      when the pane layout meets the set of criteria, generating a document pane comprising a playable video control for playing the video content within the document pane; and
      when the pane layout does not meet the set of criteria, generating the document pane comprising a non-playable video indicator that indicates that the document pane has associated video content, but does not play the video content within the generated document pane.

2. The non-transitory machine readable medium of claim 1, wherein the set of properties comprises at least one of a set of dimensions for the video content and an amount of text in the other media content.

3. A non-transitory machine readable medium storing a program which when executed by at least one processing unit of a device generates a set of video document panes for a set of video documents, each video document comprising video content and other media content, the program comprising sets of instructions for:
   identifying the set of video documents to be presented in a particular mode;
   for each video document:

identifying a pane layout for displaying a summarized view of the video document;
determining whether the identified pane layout meets a set of criteria,
wherein the set of criteria comprises at least one of a minimum size for the document pane layout and a minimum size for space allocated to the video content within the document pane layout;
when the pane layout meets the set of criteria, generating a document pane comprising a playable video control for playing the video content within the document pane; and
when the pane layout does not meet the set of criteria, generating the document pane comprising a non-playable video indicator that indicates that the document pane has associated video content, but does not play the video content within the generated document pane.

4. A non-transitory machine readable medium storing a program which when executed by at least one processing unit of a device generates a set of video document panes for a set of video documents, each video document comprising video content and other media content, the program comprising sets of instructions for:
identifying the set of video documents to be presented in a particular mode;
for each video document:
identifying a pane layout for displaying a summarized view of the video document;
determining whether the identified pane layout meets a set of criteria;
when the pane layout meets the set of criteria, generating a document pane comprising a playable video control for playing the video content within the document pane, wherein the playable video control comprises a user interface (UI) element for viewing the associated video document within the generated document pane, wherein the UI element is a first UI element and the particular mode is a first mode that displays a plurality of document panes, wherein the generated document pane comprising the playable video control further comprises a second UI item for viewing associated video document in a second mode that only displays a single document at a time; and
when the pane layout does not meet the set of criteria, generating the document pane comprising a non-playable video indicator that indicates that the document pane has associated video content, but does not play the video content within the generated document pane.

5. The non-transitory machine readable medium of claim 4, wherein the playable video control is also used to display the video content in an article view, wherein selection of the second UI item during playback of the video content continuously plays the video content in the playable video control while transitioning to the article view.

6. A non-transitory machine readable medium storing a program which when executed by at least one processing unit of a device generates a set of video document panes for a set of video documents, each video document comprising video content and other media content, the program comprising sets of instructions for:
identifying the set of video documents to be presented in a particular mode;
for each video document:
identifying a pane layout for displaying a summarized view of the video document;
determining whether the identified pane layout meets a set of criteria;
when the pane layout meets the set of criteria, generating a document pane comprising a playable video control for playing the video content within the document pane; and
when the pane layout does not meet the set of criteria, generating the document pane comprising a non-playable video indicator that indicates that the document pane has associated video content, but does not play the video content within the generated document pane, wherein the non-playable video indicator comprises a thumbnail image and a selectable user interface (UI) item for viewing the associated video content, wherein the particular mode is a first mode that displays a plurality of document panes, wherein selection of the UI item presents the video document in a second mode and automatically initiates playback of the video content in the second mode, wherein the second mode only displays a single document at a time.

7. A non-transitory machine readable medium storing a program which when executed by at least one processing unit of a device presents a set of video documents, each video document comprising video content and other media content, the program comprising sets of instructions for:
displaying a plurality of video document panes for a plurality of video documents in a first view, each video document comprising video content and other media content;
receiving input to select a particular video document pane of the displayed plurality of video document panes;
when the particular video document pane meets a set of criteria, playing the video content of a particular video document associated with the particular document pane within the particular video document pane in the first view; and
when the particular video document pane does not meet the set of criteria, playing the video content of the particular video document in a different second view.

8. The non-transitory machine readable medium of claim 7, wherein the set of criteria comprises at least one of a minimum size for the video document pane and a minimum size for space allocated to the video content within the video document pane.

9. The non-transitory machine readable medium of claim 7, wherein the program further comprises an additional set of instructions for displaying a set of non-video document panes, wherein each video document pane comprises a video indicator that indicates that the video document pane has associated video content, wherein the video indicator comprises a thumbnail image from the video content and each video document pane further comprises a summary of the other media content.

10. The non-transitory machine readable medium of claim 7, wherein the input is a first input, the first view displays a plurality of document panes, and the second view only displays a single document at a time, wherein the program further comprises additional sets of instructions for:
receiving a second input in the particular video document pane while the video content is playing; and
in response to the second input, displaying the video document of the particular video document pane in the second view.

11. The non-transitory machine readable medium of claim 10, wherein the set of instructions for displaying the video document in the second view comprises an additional set of instructions for continuously playing the video content while transitioning from the first view to the second view.

12. The non-transitory machine readable medium of claim 7, wherein the set of instructions for displaying the video document in the second view comprises an additional set of instructions for automatically initiating playback of the video content in the second view.

13. A non-transitory machine readable medium storing a program which when executed by at least one processing unit of a device presents a set of video documents, each video document comprising video content and other media content, the program comprising sets of instructions for:
   displaying a plurality of document panes for a plurality of documents in a first view in a display area of the device, the plurality of document panes comprising the set of video documents that each comprise video content and other media content;
   while the video content of a particular video document pane is playing, receiving an input to scroll through the displayed plurality of video document panes;
   when the particular video document pane is scrolled to a threshold distance from an edge of the display area, providing a set of indications that playback of the video content of the particular video document pane is being stopped, wherein the set of indications comprises a visual indication that comprises fading at least a portion of the particular video document pane to gray; and
   stopping playback of the video content in the particular video document pane.

14. The non-transitory machine readable medium of claim 13, wherein the set of indications comprises an audio indication that fades audio associated with the particular video document pane.

15. The non-transitory machine readable medium of claim 13, wherein the input to scroll is received through a touch interface of the device.

16. The non-transitory machine readable medium of claim 13, wherein stopping the playback of the video content comprises pausing the video content at a particular point so that it can be resumed later from the particular point.

* * * * *

UNITED STATES PATENT AND TRADEMARK OFFICE
CERTIFICATE OF CORRECTION

PATENT NO. : 10,346,019 B2
APPLICATION NO. : 15/261405
DATED : July 9, 2019
INVENTOR(S) : Charles J. Migos et al.

Page 1 of 1

It is certified that error appears in the above-identified patent and that said Letters Patent is hereby corrected as shown below:

In the Claims

Claim 3, Column 19, Line 6 replace "the document pane layout" with --the pane layout--.

Claim 3, Column 19, Line 8 replace "the document pane layout" with --the pane layout--.

Signed and Sealed this
Twenty-fourth Day of November, 2020

Andrei Iancu
*Director of the United States Patent and Trademark Office*